(12) United States Patent
Harada et al.

(10) Patent No.: US 8,964,126 B2
(45) Date of Patent: Feb. 24, 2015

(54) VIDEO PROCESSING SYSTEM, VIDEO PROCESSING METHOD, DATABASE FOR VIDEO PROCESSING AND GENERATING METHOD THEREOF, VIDEO PROCESSING APPARATUS, CONTROL METHOD THEREOF AND CONTROL PROGRAM THEREOF

(75) Inventors: Hiroo Harada, Tokyo (JP); Naotake Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/123,416

(22) PCT Filed: Jun. 12, 2012

(86) PCT No.: PCT/JP2012/065445
§ 371 (c)(1),
(2), (4) Date: Dec. 2, 2013

(87) PCT Pub. No.: WO2012/173267
PCT Pub. Date: Dec. 20, 2012

(65) Prior Publication Data
US 2014/0092313 A1 Apr. 3, 2014

(30) Foreign Application Priority Data

Jun. 13, 2011 (JP) .................................. 2011-131332

(51) Int. Cl.
*H04N 5/14* (2006.01)
*H04N 9/64* (2006.01)
(Continued)

(52) U.S. Cl.
CPC ............ *H04N 5/91* (2013.01); *G06F 17/30849* (2013.01); *H04N 5/783* (2013.01);
(Continued)

(58) Field of Classification Search
USPC ................. 348/571, 708, 714–716, 718, 719; 725/134, 115, 142; 386/239, 267, 272, 386/326, 353

IPC .................................................. H04N 5/14,9/64
See application file for complete search history.

(56) References Cited

U.S. PATENT DOCUMENTS 6,002,438 A * 12/1999 Hocevar et al. ............... 348/716
6,307,588 B1 * 10/2001 Olson et al. ................... 348/715
(Continued)

FOREIGN PATENT DOCUMENTS

WO    WO 2009/035032 A1    3/2009

OTHER PUBLICATIONS

International Search Report (ISR) (PCT Form PCT/ISA/210), in PCT/JP2012/065445, dated Jul. 31, 2012.
(Continued)

*Primary Examiner* — Sherrie Hsia
(74) *Attorney, Agent, or Firm* — McGinn IP Law Group, PLLC

(57) ABSTRACT

A video processing apparatus includes a storage unit, an input unit, and a determining unit. The storage unit stores a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene. The input unit inputs a characteristic amount which is extracted from each of the frames of a new scene. The determining unit determines whether the new scene represented by the inputted characteristic amount is the derived scene of the scene group or not by verifying the inputted characteristic amount with the characteristic amount of the typical scene of the scene group stored in the storage unit.

9 Claims, 28 Drawing Sheets

(51) Int. Cl.
  *H04N 5/91* (2006.01)
  *G06F 17/30* (2006.01)
  *H04N 5/783* (2006.01)
  *G06K 9/00* (2006.01)
  *G11B 27/28* (2006.01)
  *G11B 27/32* (2006.01)
  *H04N 21/234* (2011.01)
  *H04N 21/254* (2011.01)
  *H04N 21/2743* (2011.01)

(52) U.S. Cl.
  CPC ............ *G06K9/00758* (2013.01); *G11B 27/28* (2013.01); *G11B 27/329* (2013.01); *H04N 21/23418* (2013.01); *H04N 21/2541* (2013.01); *H04N 21/2743* (2013.01); *G06F 17/30858* (2013.01)
  USPC .......................................... 348/714; 348/715

(56) References Cited

U.S. PATENT DOCUMENTS

| | | | |
|---|---|---|---|
| 8,422,755 B2* | 4/2013 | Drozdzal et al. | 348/715 |
| 2001/0017670 A1* | 8/2001 | Menkhoff et al. | 348/716 |
| 2006/0158558 A1* | 7/2006 | Chung | 348/571 |
| 2006/0187358 A1* | 8/2006 | Lienhart et al. | 348/571 |
| 2010/0299353 A1 | 11/2010 | Kodate et al. | |

OTHER PUBLICATIONS

Wen-Gang Chen, et.al., 'Content-based video retrieval using the shot cluster tree', Proceedings of the Second International Conference on Machine Learning and Cybernetics 2003, Xi'an, Nov. 2003, vol. 5, p. 2901-2906, ISBN: 0-7803-8131-9.

Brasnett, P., et.al., 'Recent developments on standardisation of MPEG-7 Visual Signature Tools', Proceedings of IEEE International Conference on Multimedia and Expo (ICME) 2010, Jul. 2010, p. 1347-1352, ISBN:978-1-4244-7491-2.

* cited by examiner

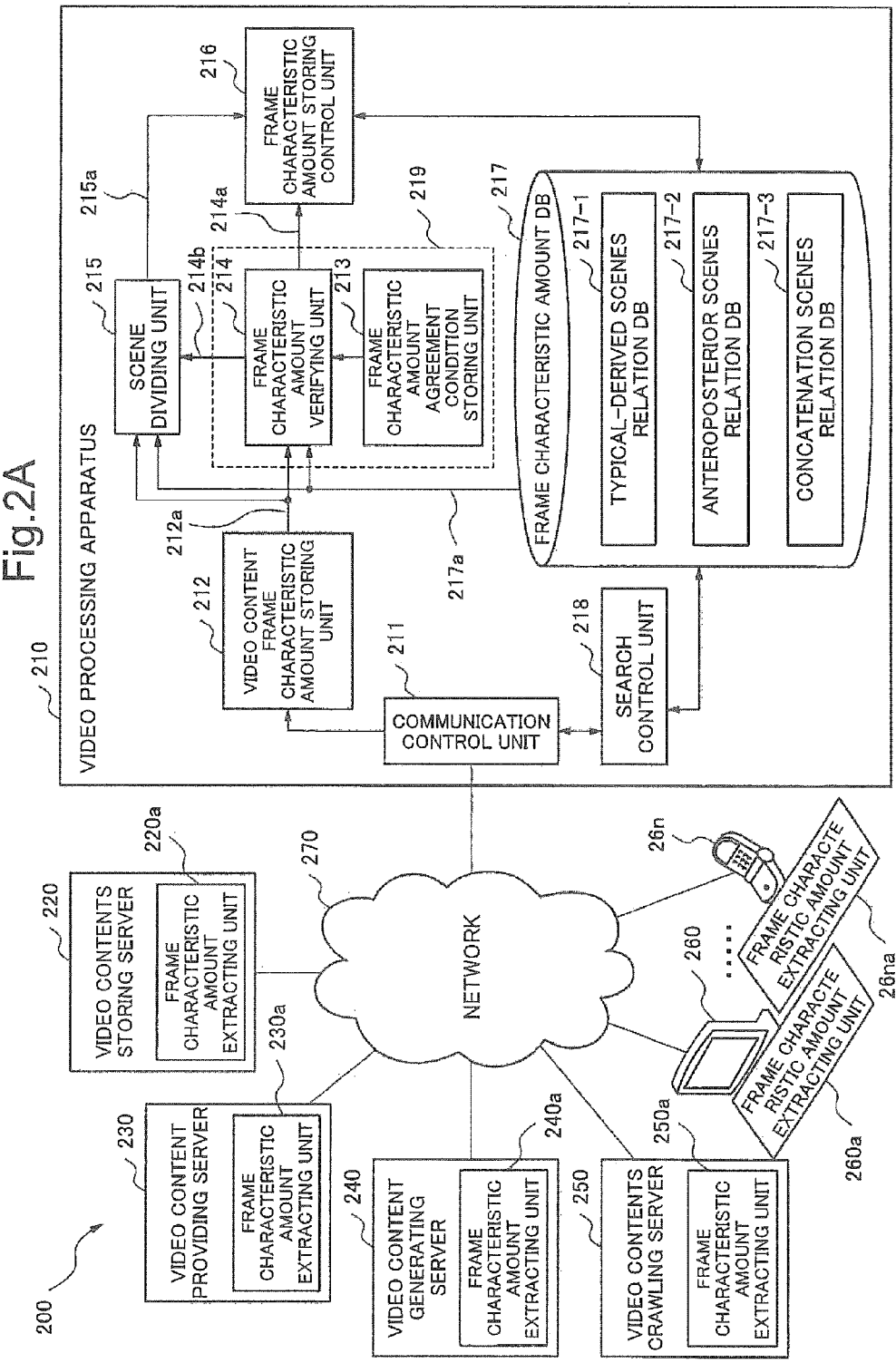

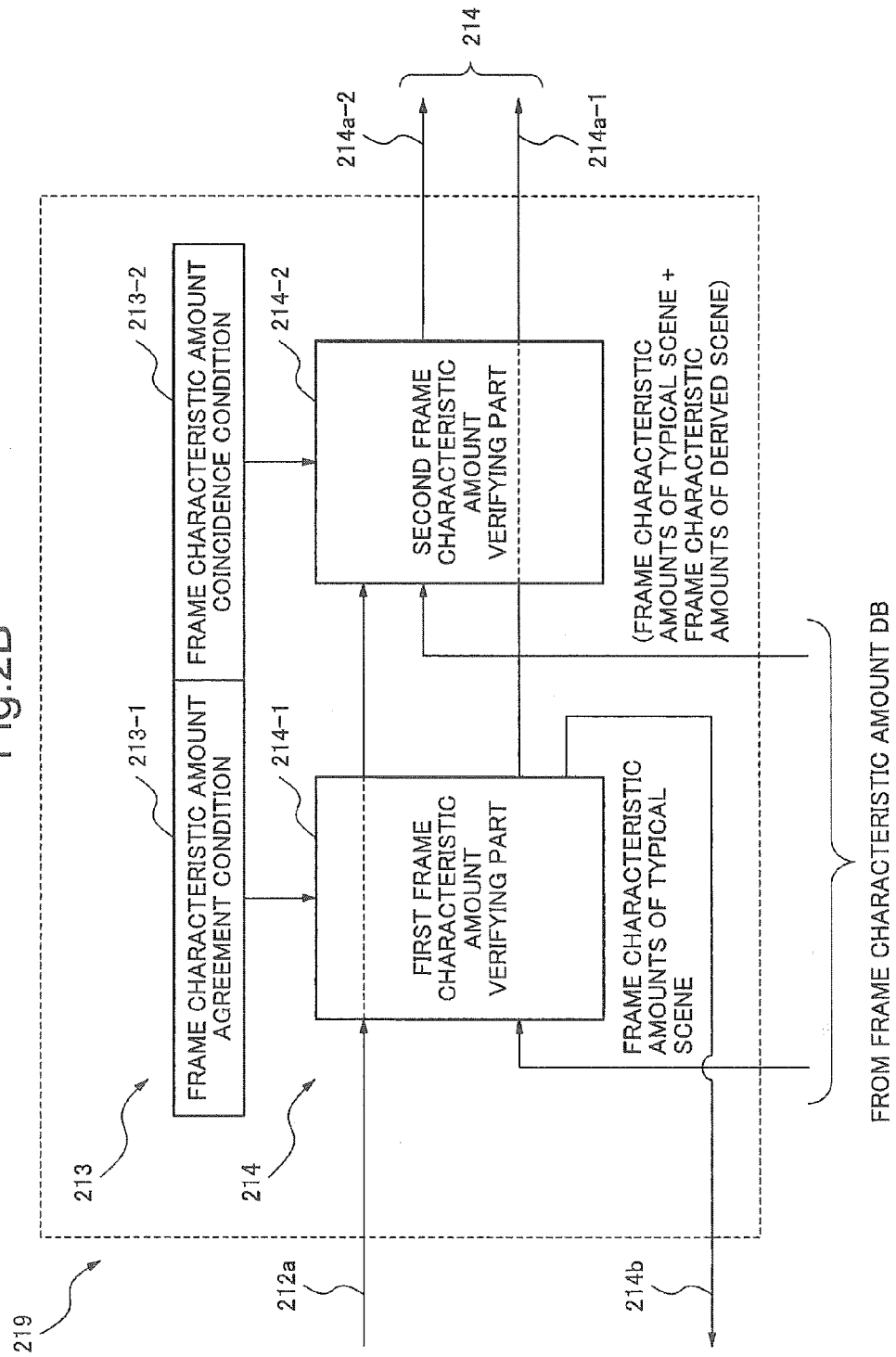

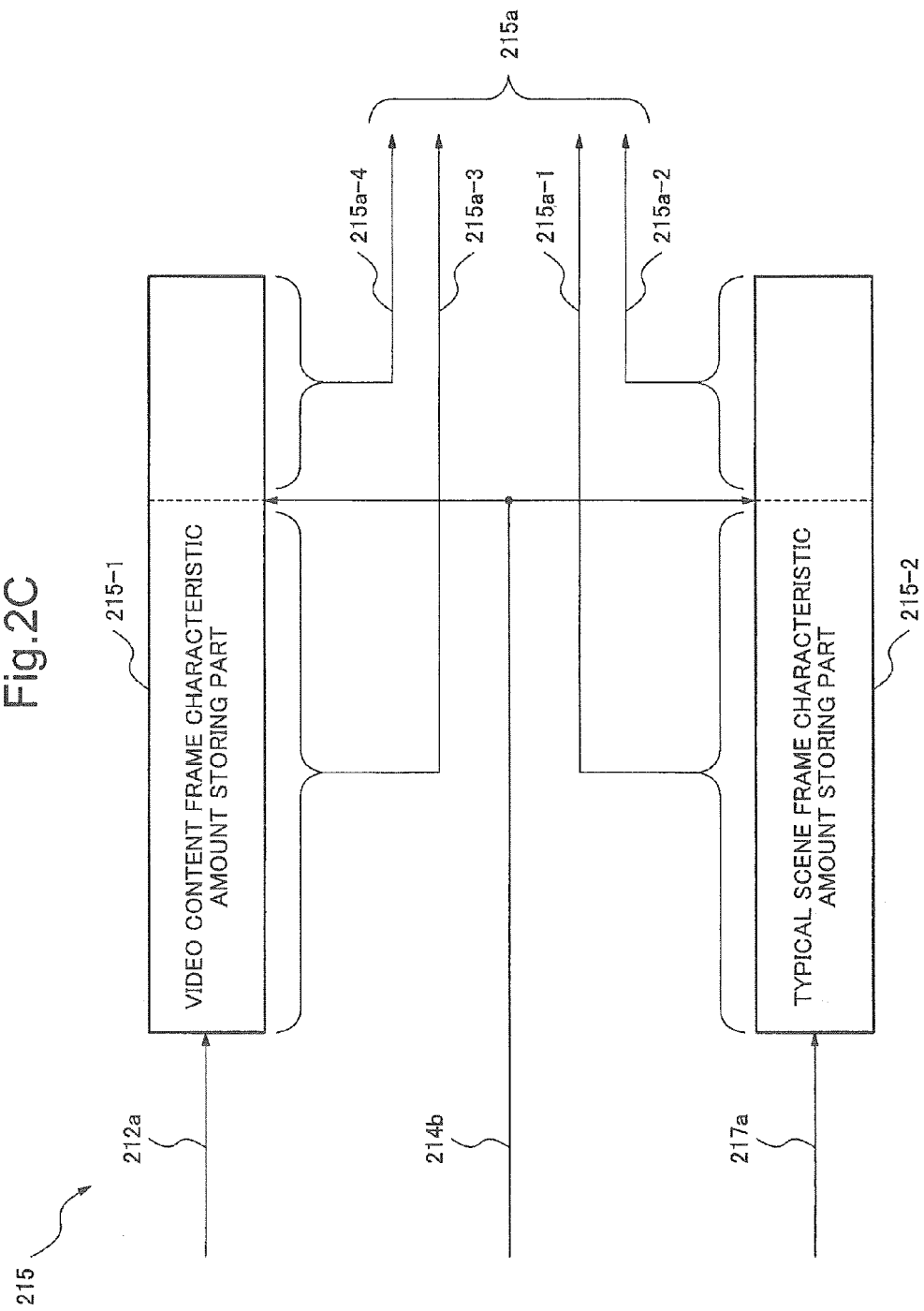

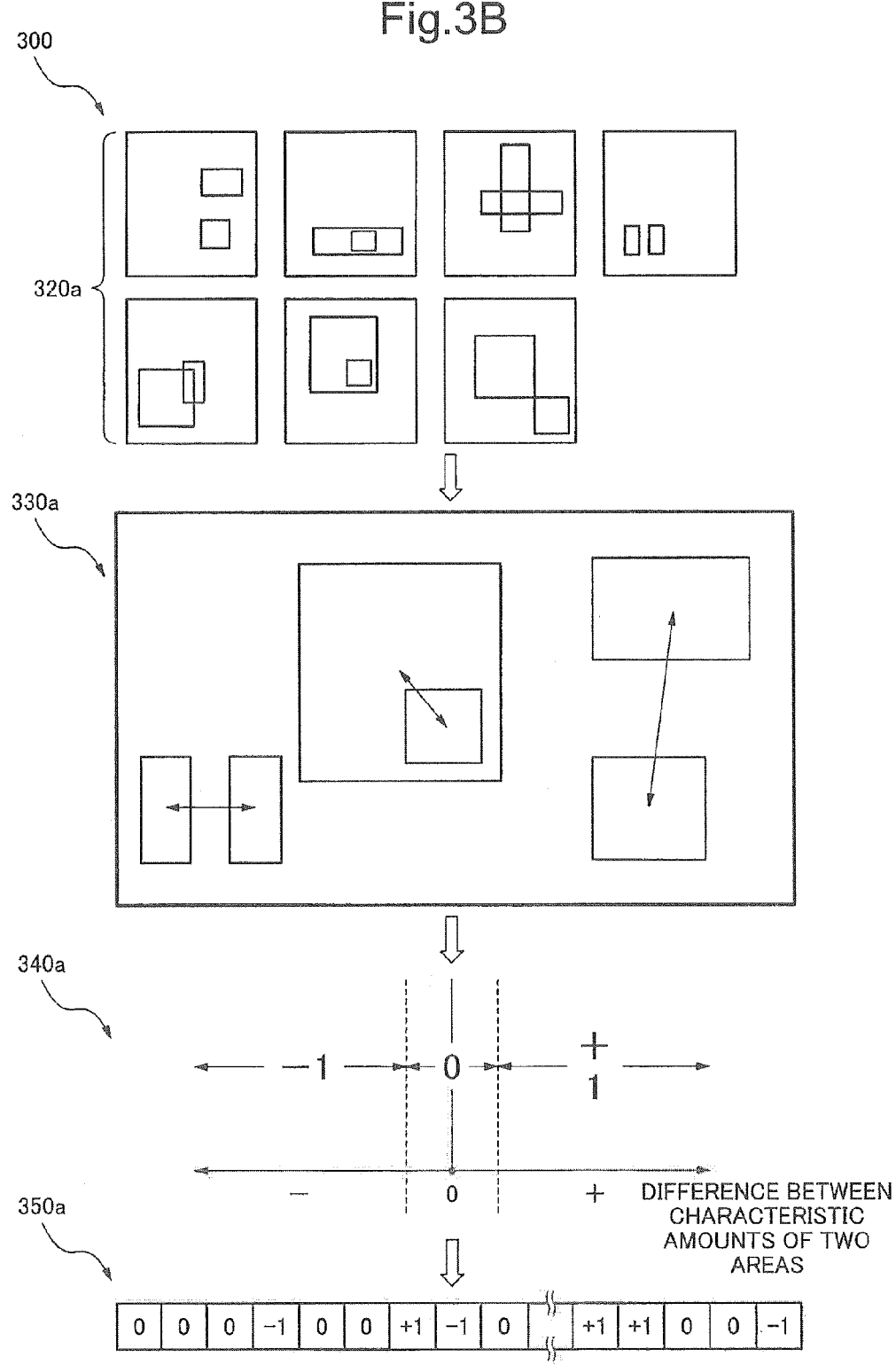

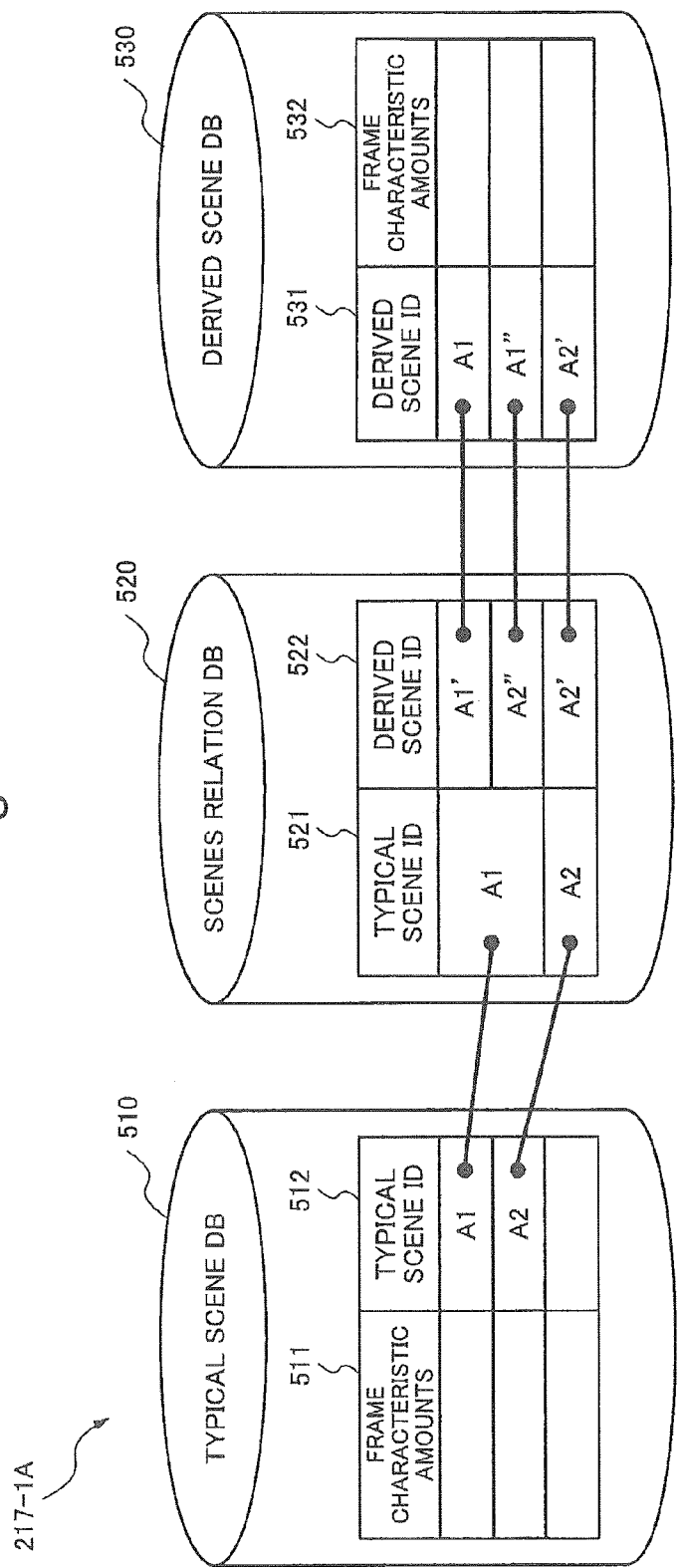

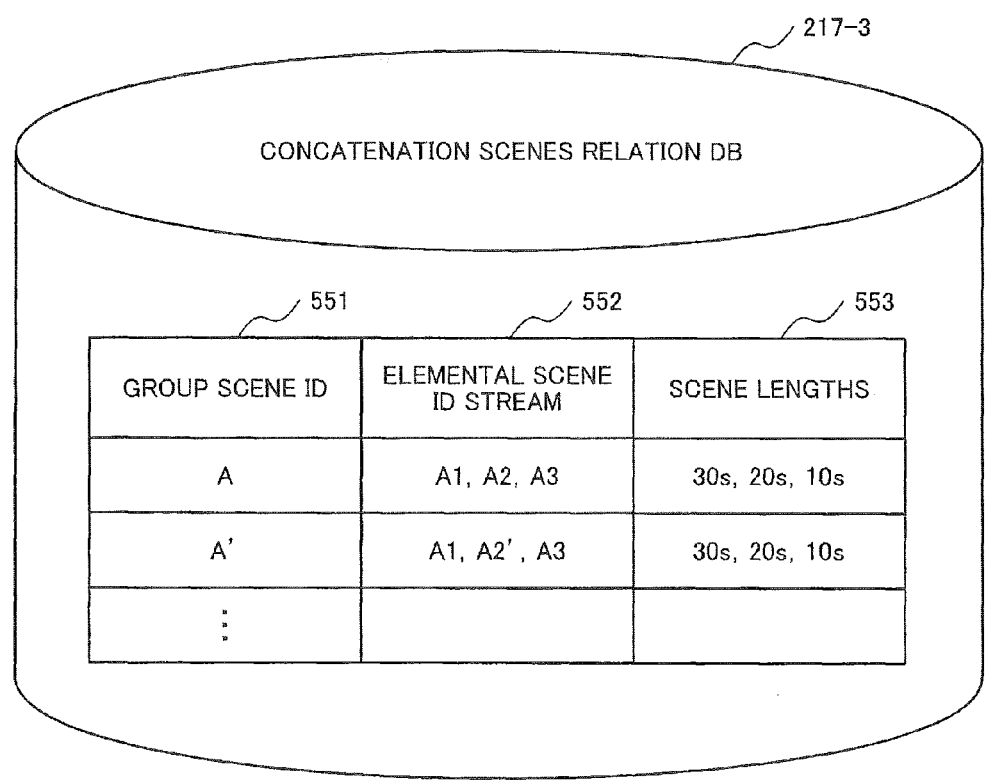

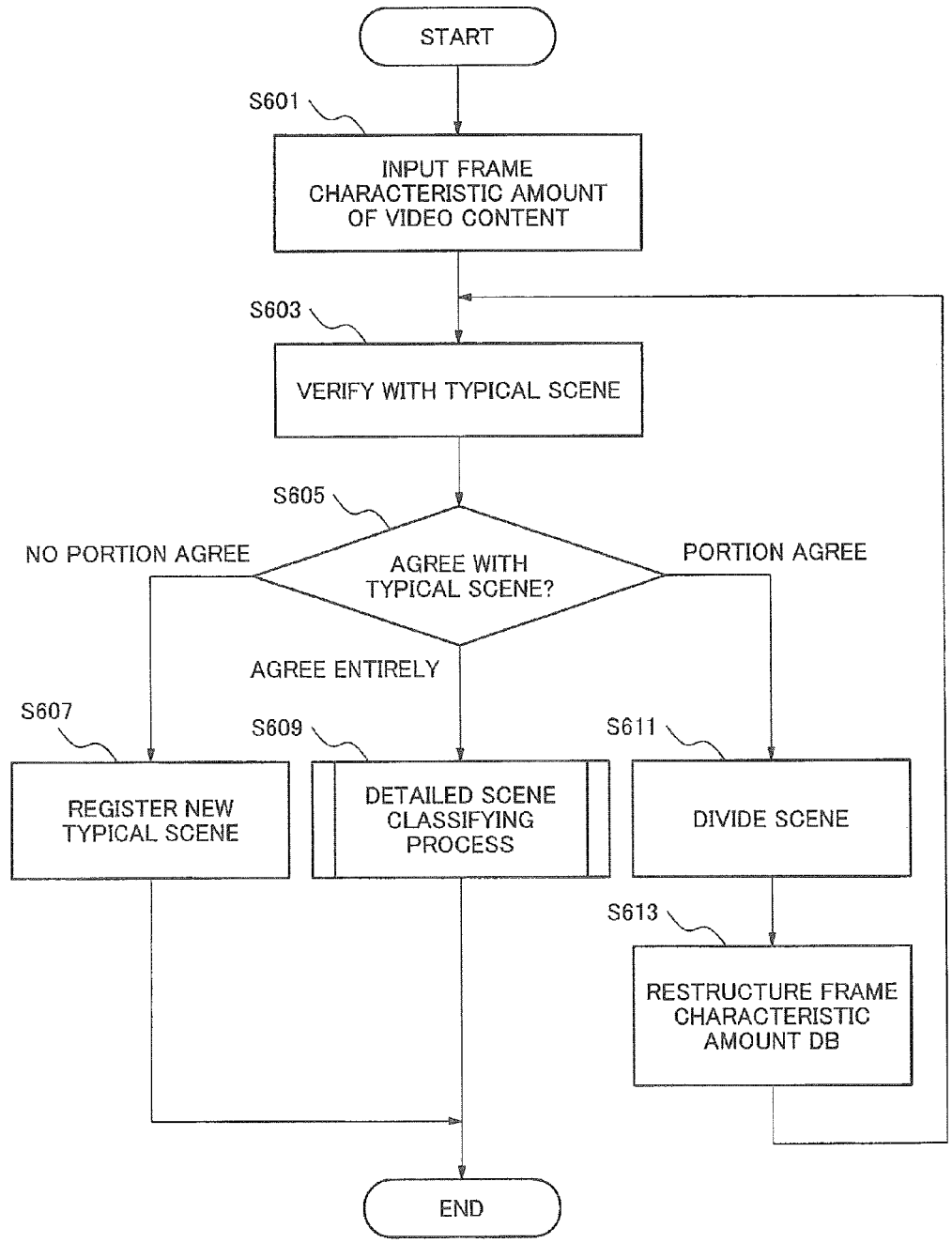

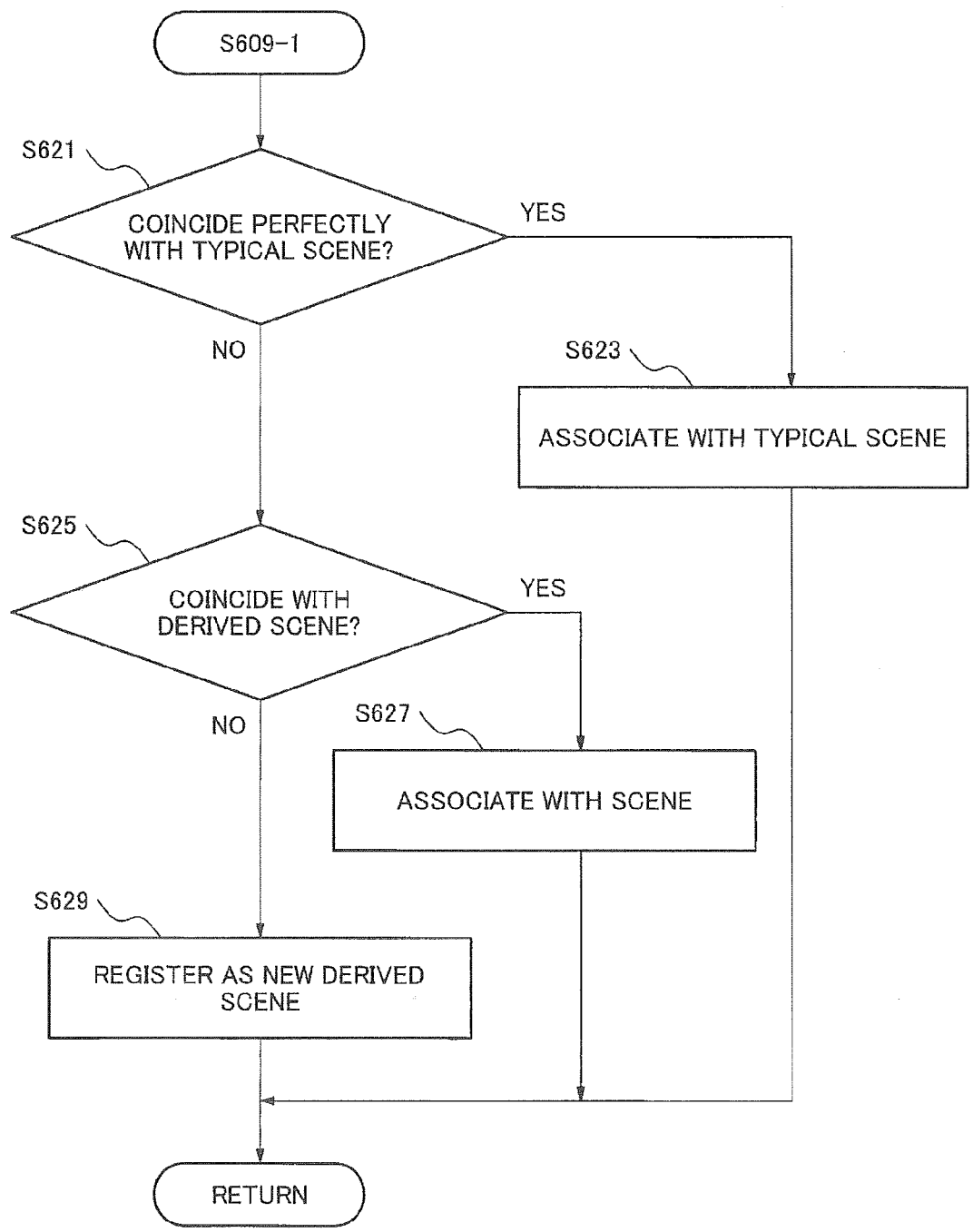

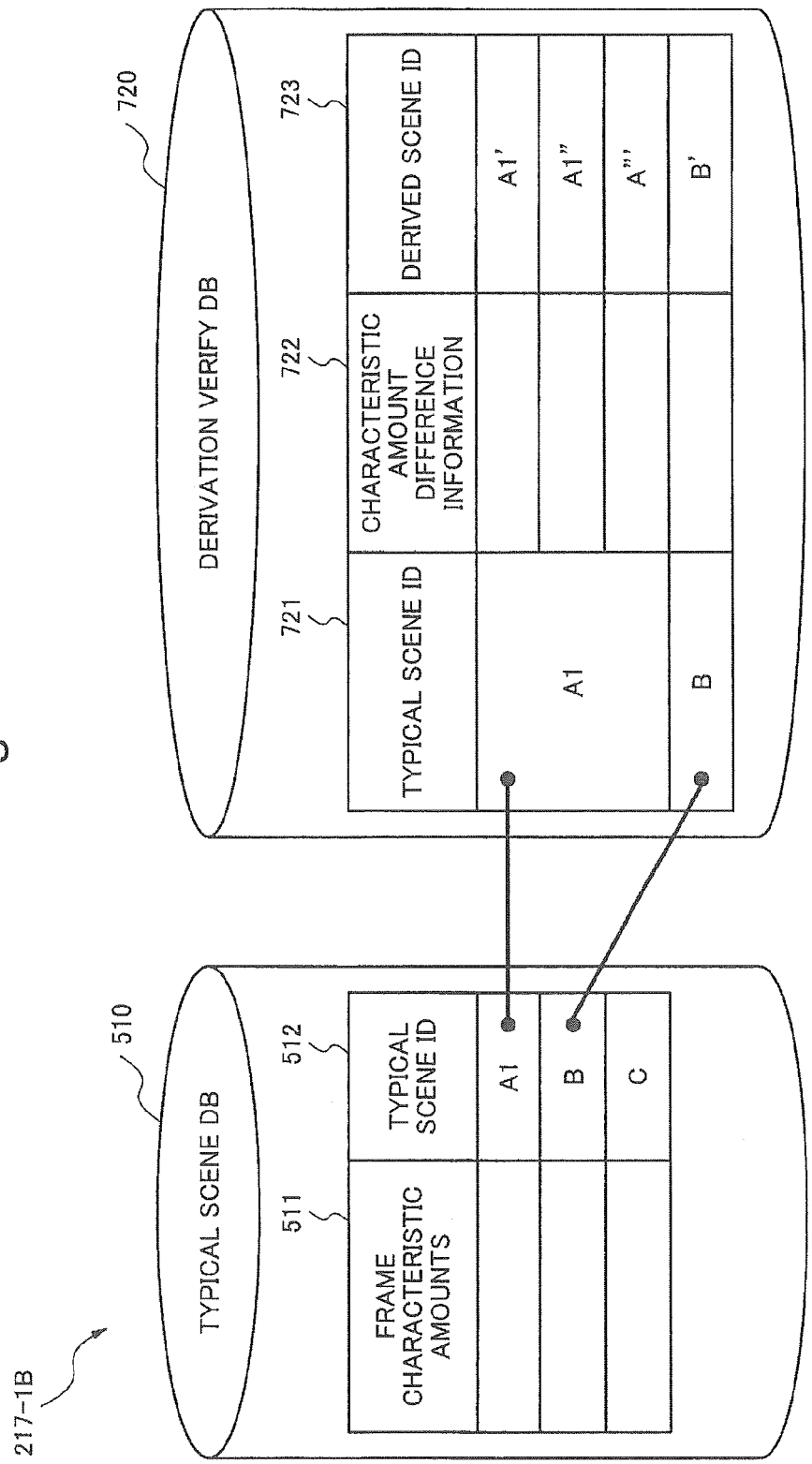

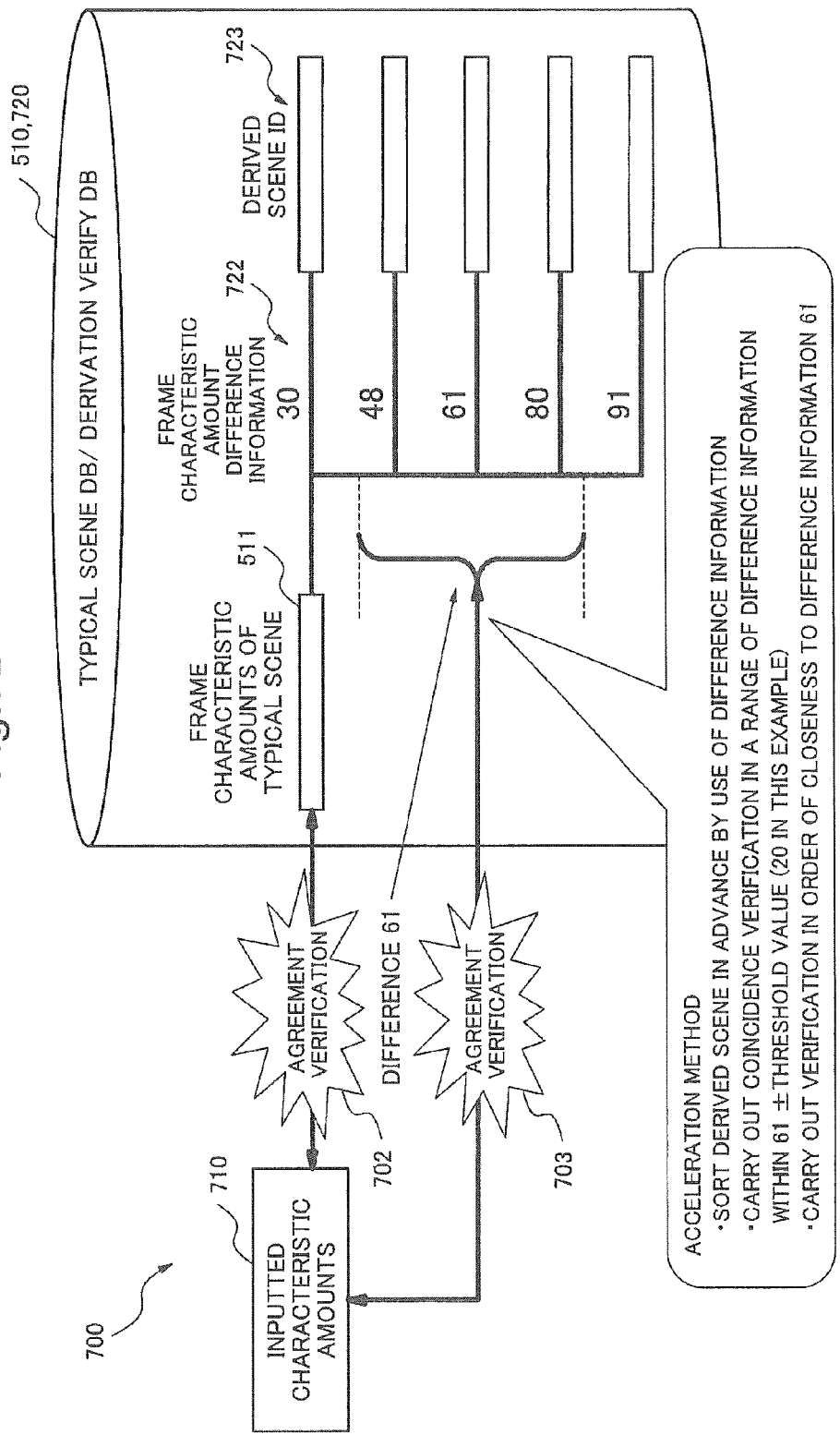

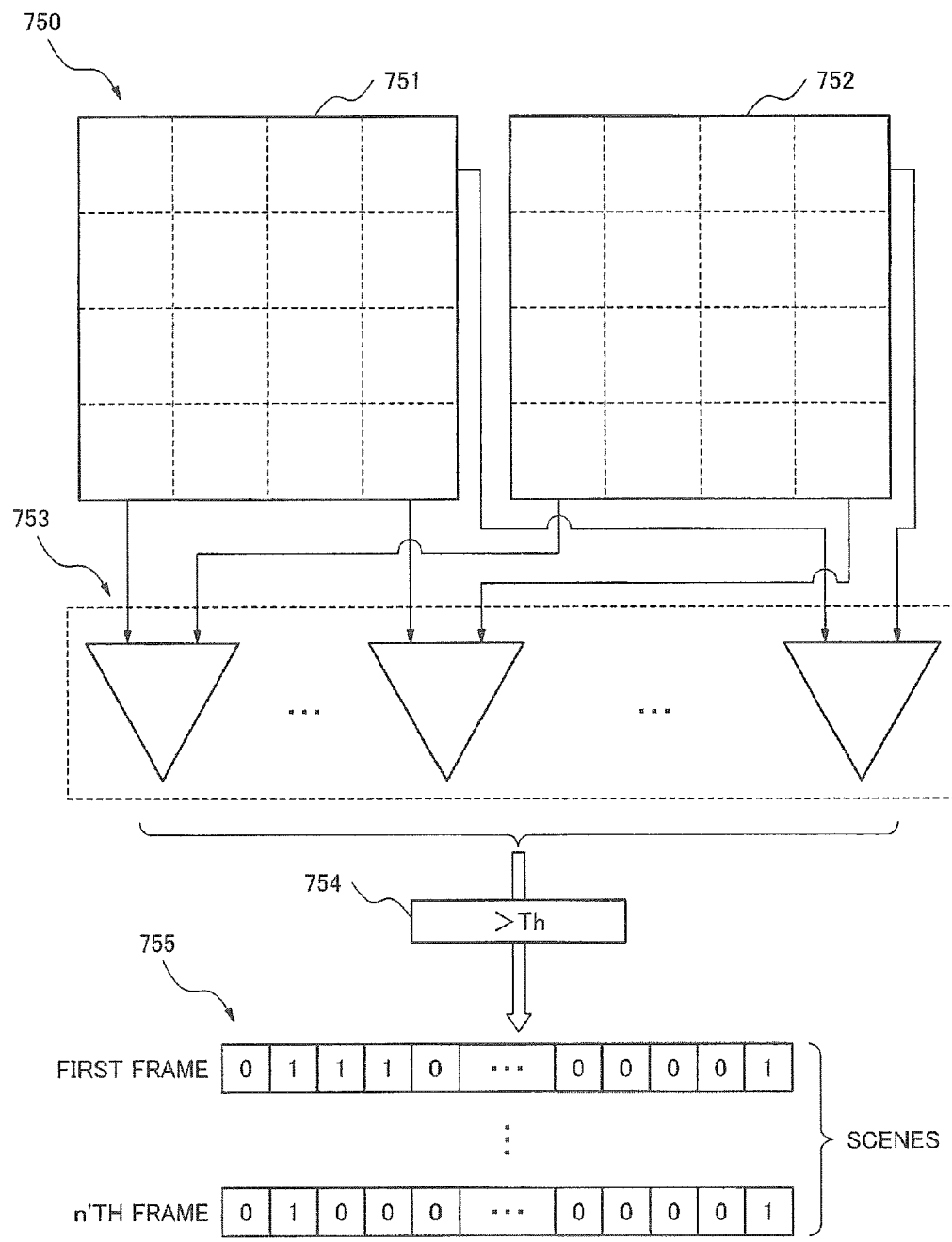

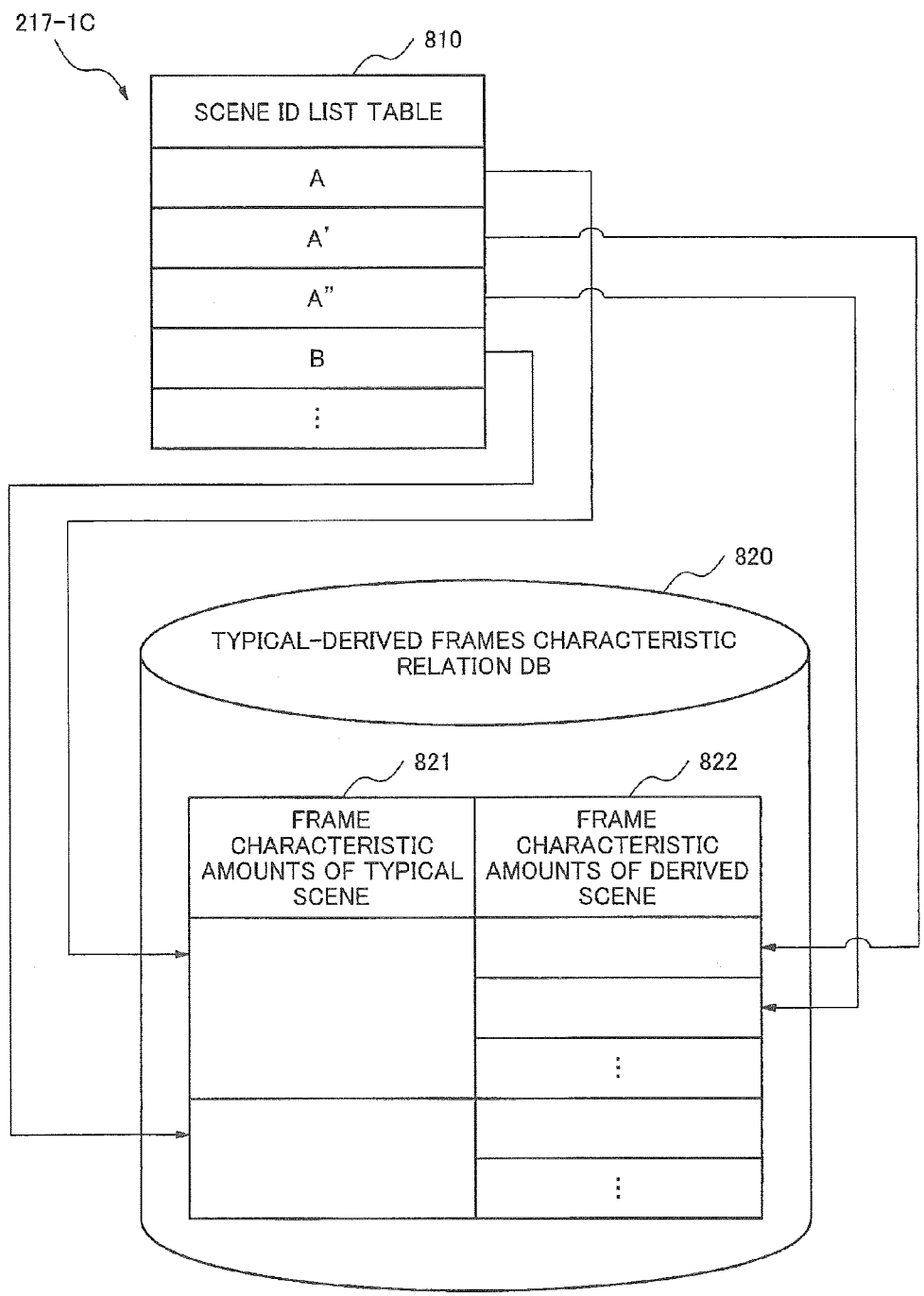

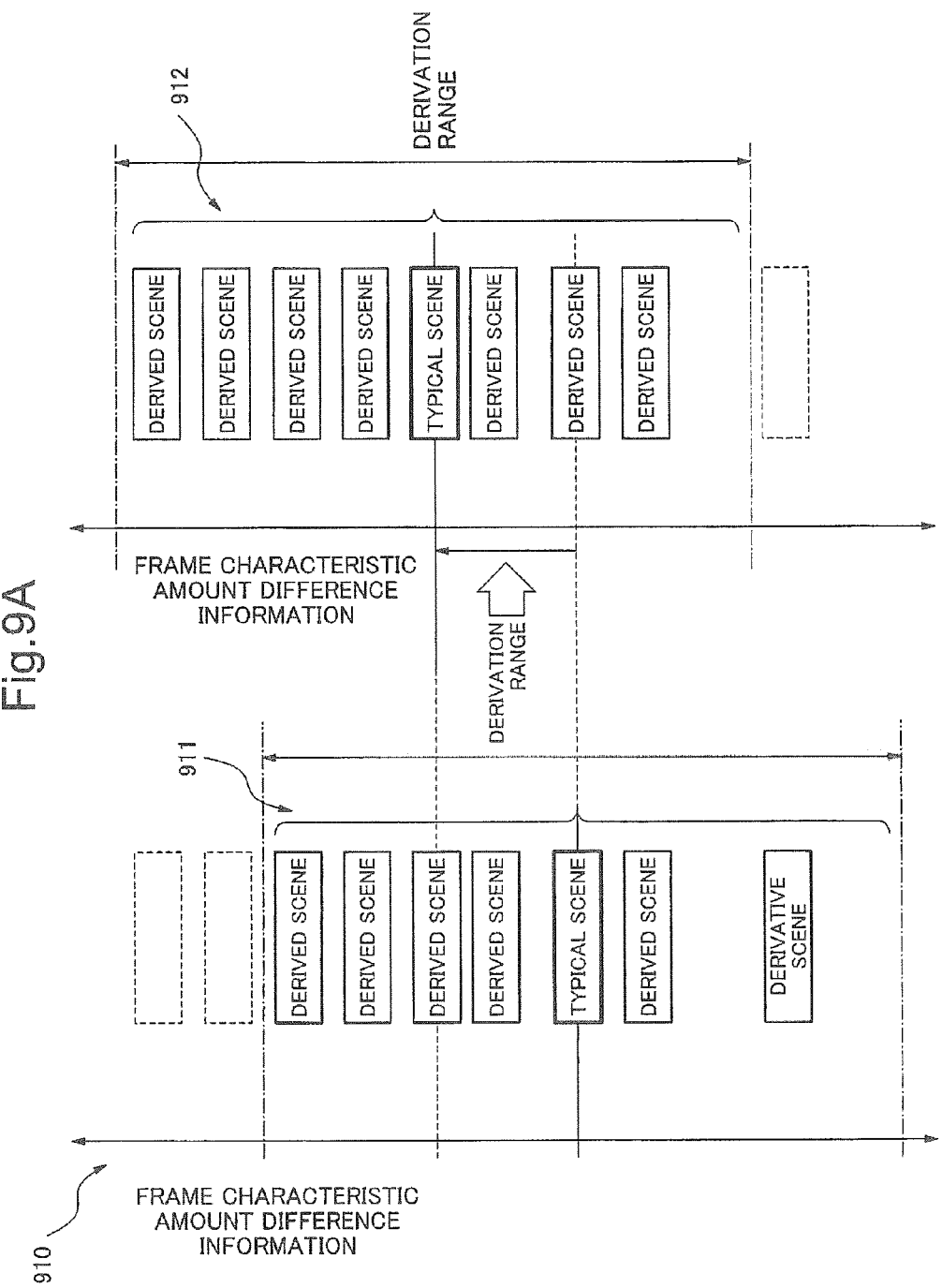

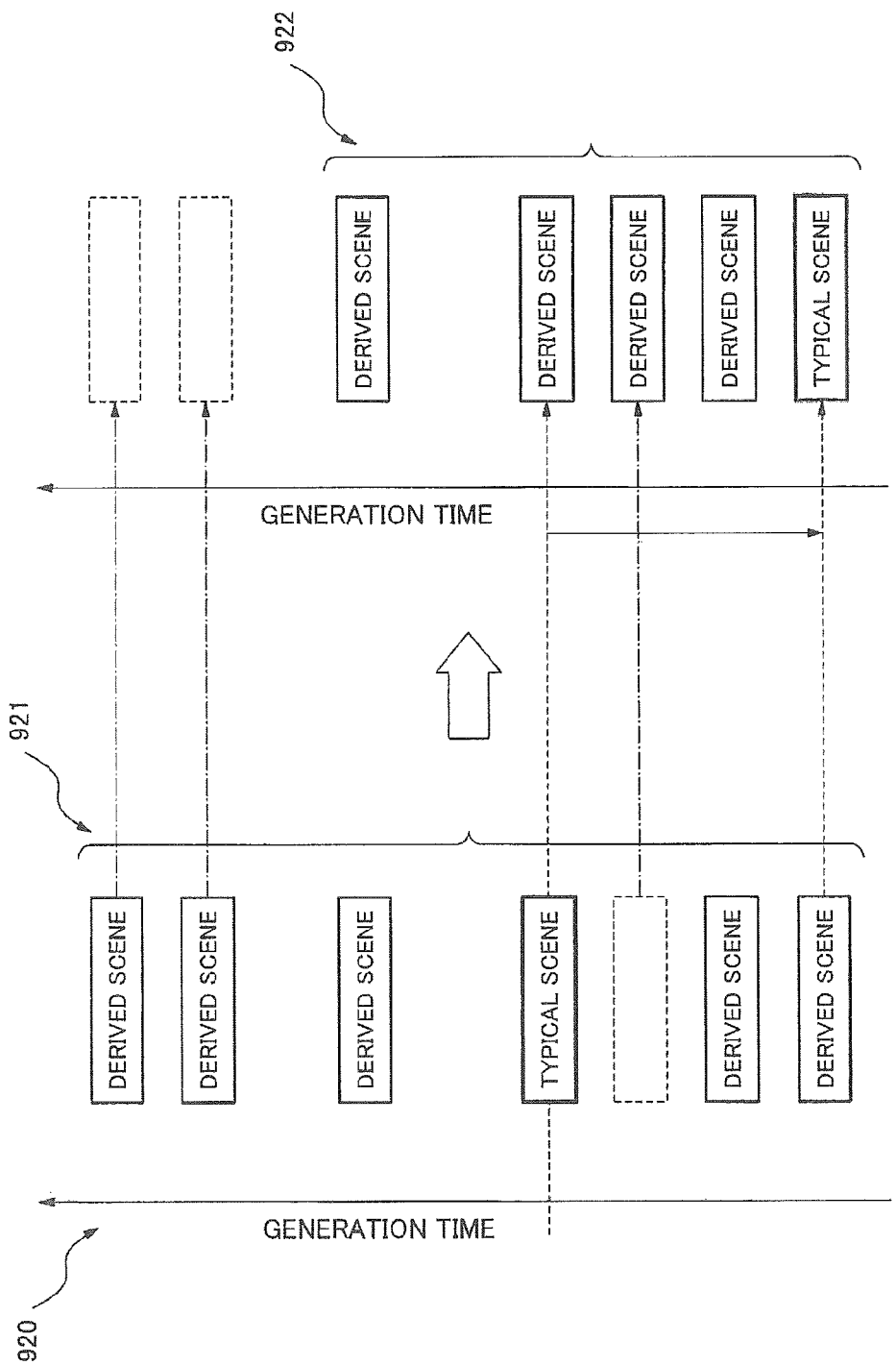

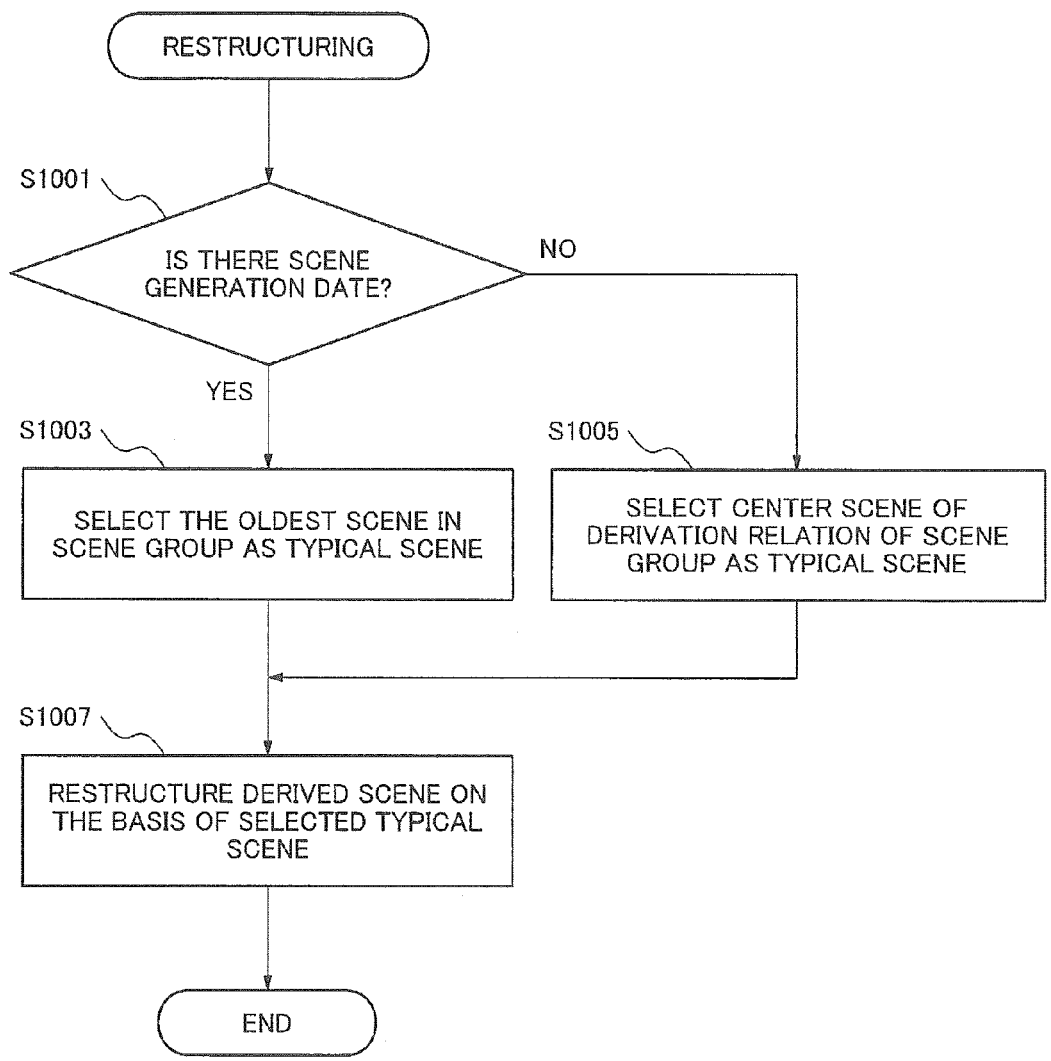

※ RADIUS = AGREEMENT DECISION CONDITION

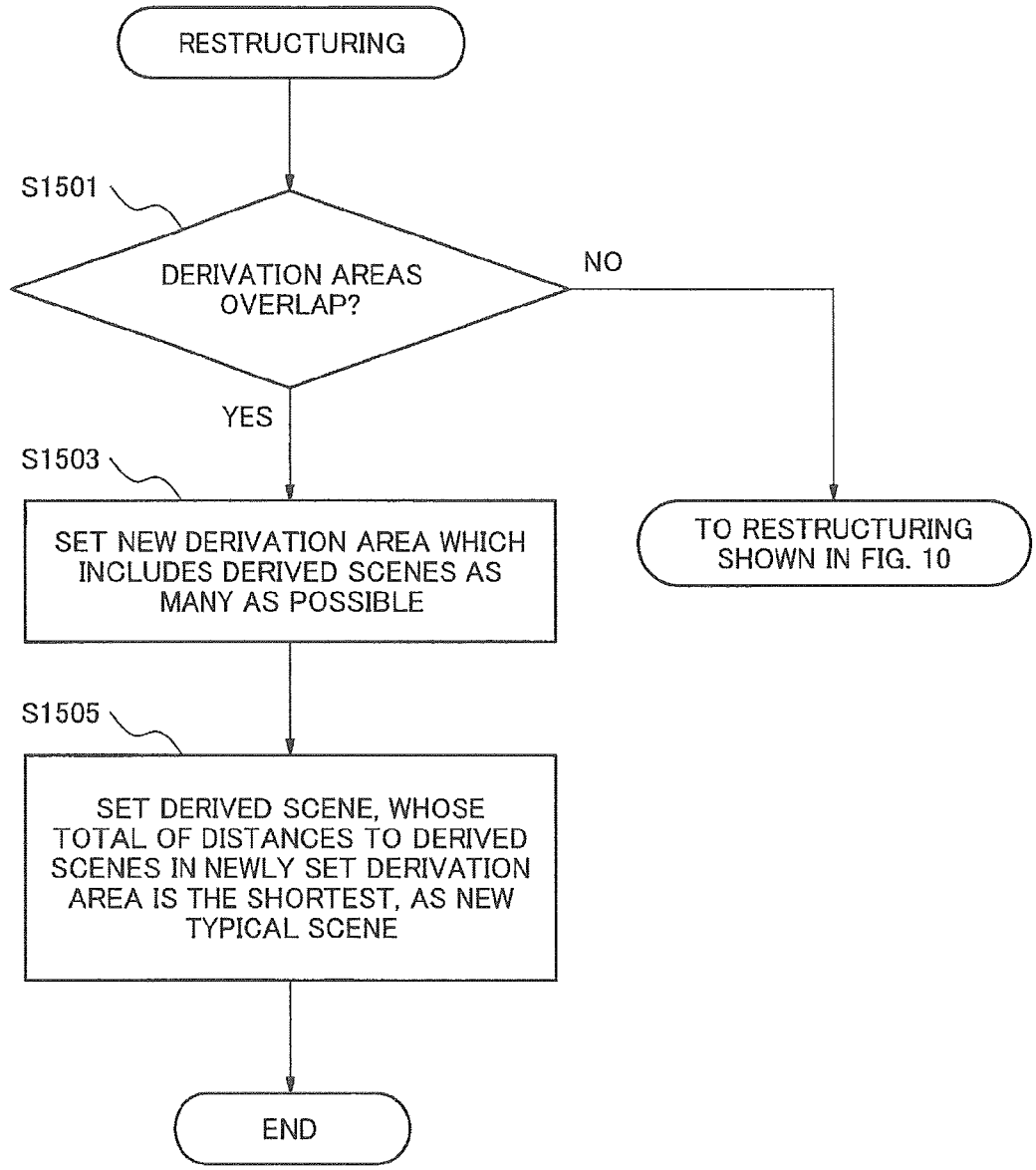

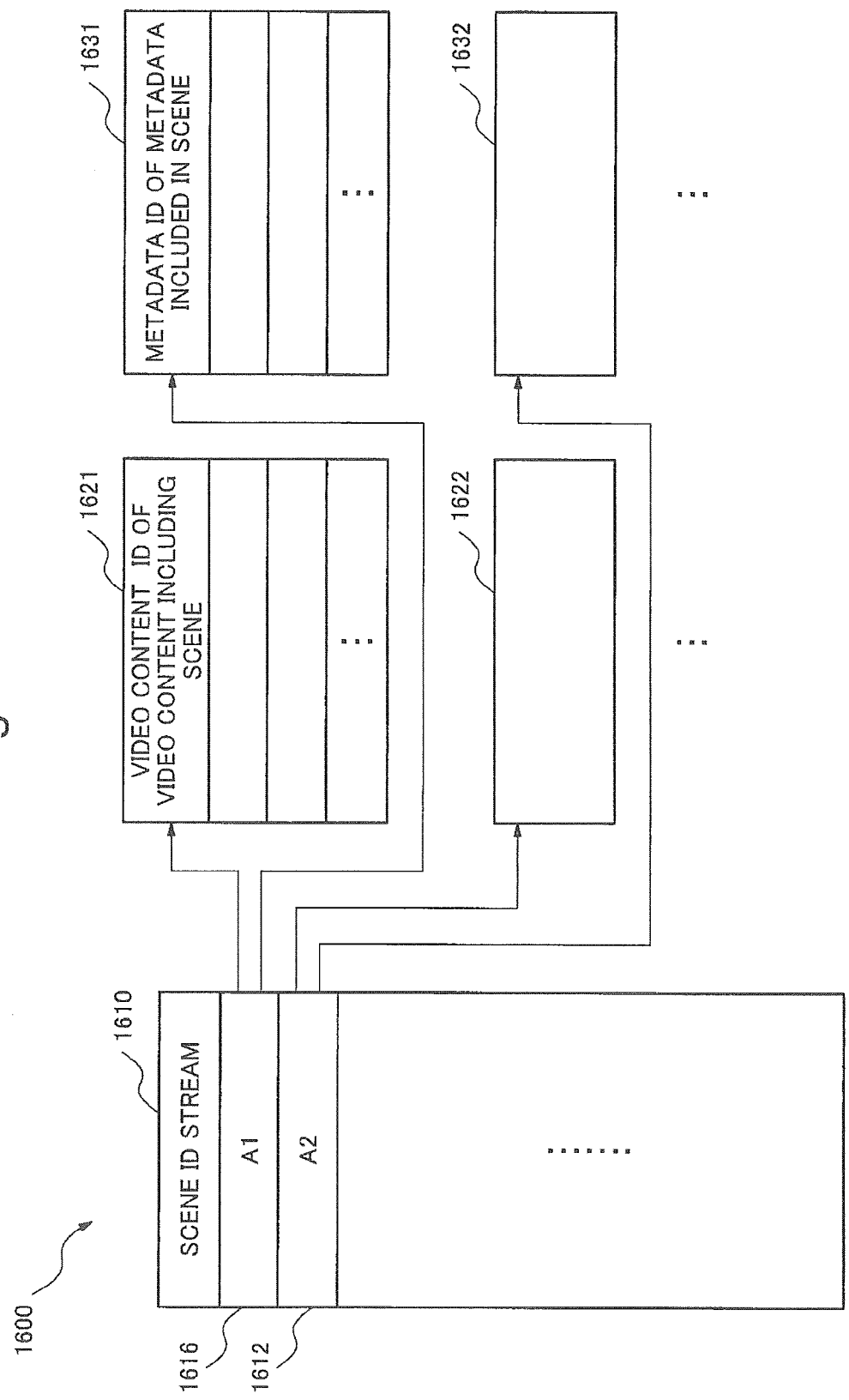

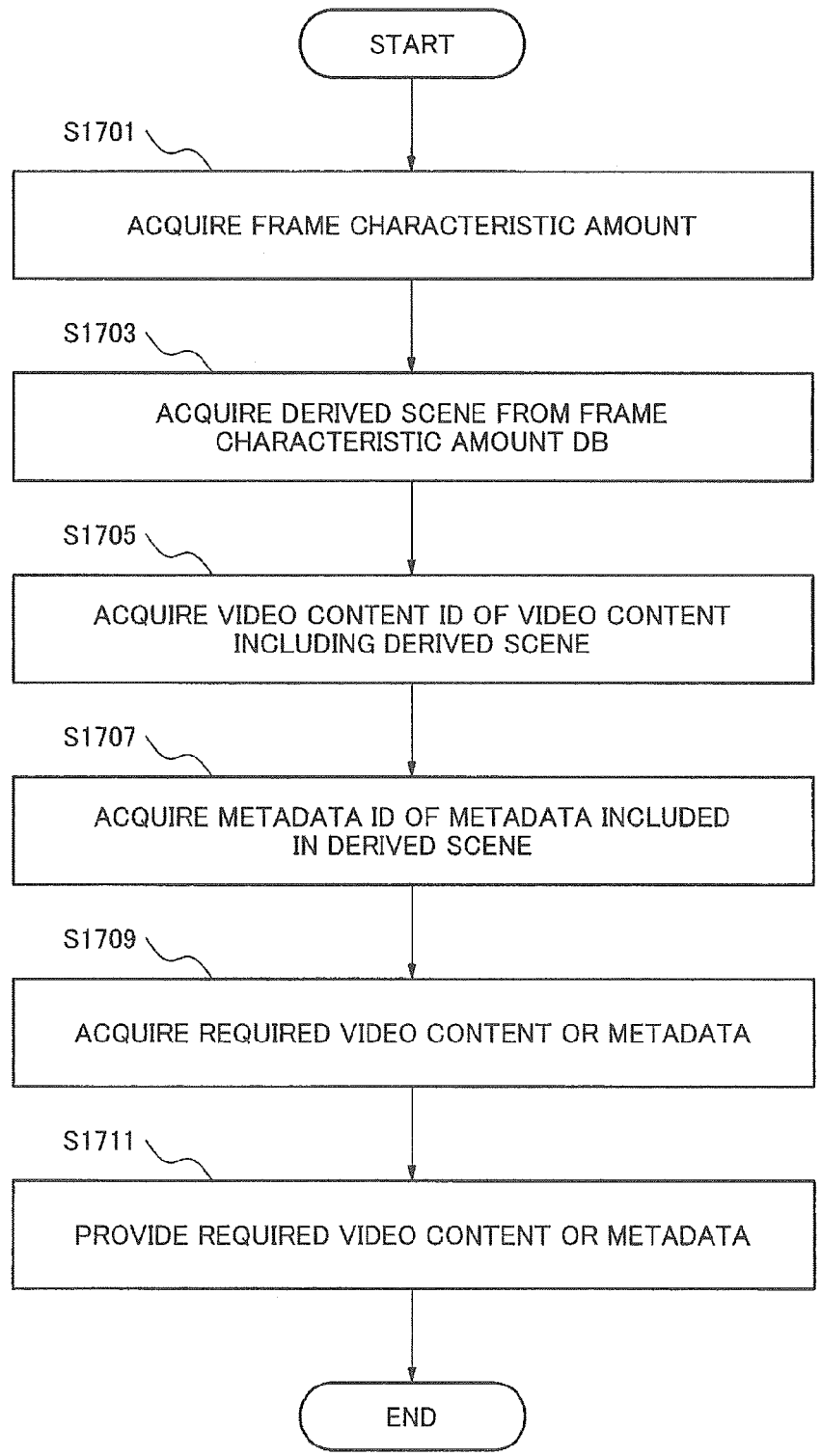

VIDEO PROCESSING SYSTEM, VIDEO PROCESSING METHOD, DATABASE FOR VIDEO PROCESSING AND GENERATING METHOD THEREOF, VIDEO PROCESSING APPARATUS, CONTROL METHOD THEREOF AND CONTROL PROGRAM THEREOF

TECHNICAL FIELD

The present invention relates to technology for verifying video data.

BACKGROUND ART

In the above-mentioned technical field, a patent literature 1 discloses technology, wherein, when a client requests to upload video data for browsing on a site, a verifying server verifies the video data with video data already registered by a registrant to determine whether the video data should be uploaded or not (refer to [FIG. 1]). Moreover, the patent literature 1 discloses that it is possible to realize high speed verifying process by use of thumbnail images in verifying by the verifying server and furthermore by use of a group of still pictures which are extracted optionally or randomly in verifying.

CITATION LIST

Patent Literature

[Patent literature 1] International Publication WO/2009/035032

SUMMARY OF INVENTION

Technical Problem

According to the technology disclosed in the above-mentioned patent literature 1, the database for verifying the video data (hereinafter, referred to as DB) with the thumbnail images is used. However, it is necessary that a reference server refers to all of the thumbnail images. As a result, the technology has a limit in reduction of a time required for the reference.

An object of the present invention is to provide technology for solving the above-mentioned problem.

Solution to Problem

A video processing apparatus according to an exemplary aspect of the invention includes: a storage means for storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene; an input means for inputting a characteristic amount which is extracted from a new scene; and a determining means for determining whether the new scene represented by the inputted characteristic amount is the derived scene of the scene group or not by verifying the inputted characteristic amount with the characteristic amount of the typical scene of the scene group stored in the storage means.

A method for controlling a video processing apparatus according to an exemplary aspect of the invention includes: storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene; inputting a characteristic amount which is extracted from a new scene; and determining whether the new scene represented by the inputted characteristic amount is the derived scene of the scene group or not by verifying the inputted characteristic amount with the characteristic amount of the typical scene of the scene group.

A computer readable storage medium according to an exemplary aspect of the invention records thereon a program, causing a computer to perform a method including: storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene; inputting a characteristic amount which is extracted from a new scene; and determining whether the new scene represented by the inputted characteristic amount is the derived scene of the scene group or not by verifying the inputted characteristic amount with the characteristic amount of the typical scene of the scene group.

A database according to an exemplary aspect of the invention stores a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene, wherein as a result of a verification of an inputted characteristic amount with the characteristic amount of the typical scene of the scene group stored in the database, in case it is determined that a new scene represented by the inputted characteristic amount is the derived scene of the scene group, the database stores the new scene represented by the inputted characteristic amount as the derived scene of the scene group, and in case it is determined that the new scene represented by the inputted characteristic amount is not the derived scene of the scene group, the database stores the new scene represented by the inputted characteristic amount as a new typical scene.

A method for generating a database for storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene, according to an exemplary aspect of the invention includes: extracting a characteristic amount from a new scene; determining whether the new scene represented by the extracted characteristic amount is the derived scene of the scene group or not by verifying the extracted characteristic amount with the characteristic amount of the typical scene of the scene group stored in the database; and in case it is determined that the new scene represented by the extracted characteristic amount is the derived scene of the scene group, setting the scene represented by the extracted characteristic amount as the derived scene of the scene group, and in case it is determined that the new scene represented by the extracted characteristic amount is not the derived scene of the scene group, setting the new scene represented by the extracted characteristic amount as a new typical scene.

A video processing system according to an exemplary aspect of the invention includes: a storage means for storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene; a characteristic amount extract means for extracting a characteristic amount from a new scene; and a determining means for determining whether the new scene represented by the extracted characteristic amount is the derived scene of the scene group or not by verifying the extracted characteristic amount with the characteristic amount of the typical scene of the scene group stored in the storage means.

A video processing method according to an exemplary aspect of the invention includes: storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene; extracting a characteristic amount from a new scene; and determining whether the new scene represented by the extracted characteristic amount is the derived scene of the scene group or not by verifying the extracted characteristic amount with the characteristic amount of the typical scene of the scene group.

Advantageous Effect of Invention

According to the present invention, it is possible to verify video data at a high speed with less resources.

BRIEF DESCRIPTION OF DRAWINGS

FIG. 2A is a block diagram showing a configuration of a video processing system according to a second exemplary embodiment of the present invention.

FIG. 2B is a block diagram showing an internal configuration of a frame characteristic amount verifying unit according to the second exemplary embodiment of the present invention.

FIG. 2C is a block diagram showing an internal configuration of a scene dividing unit according to the second exemplary embodiment of the present invention.

FIG. 3B is a block diagram showing a process which is carried out by the frame characteristic amount extracting unit according to the second exemplary embodiment of the present invention.

FIG. 5A is a diagram showing a first configuration of a typical-derived scenes relation DB according to the second exemplary embodiment of the present invention.

FIG. 5C is a diagram showing a concatenation scenes relation DB according to the second exemplary embodiment of the present invention.

FIG. 6A is a flowchart showing a process carried out by the video processing apparatus according to the second exemplary embodiment of the present invention.

FIG. 6B is a flowchart showing a procedure of a detailed scene classifying process according to the second exemplary embodiment of the present invention.

FIG. 7A is a diagram showing a second configuration of the typical-derived scenes relation DB according to the second exemplary embodiment of the present invention.

FIG. 7B is a diagram showing an example of using the second configuration of the typical-derived scenes relation DB according to the second exemplary embodiment of the present invention.

FIG. 7C is a diagram showing another example of difference information in the second configuration of the typical-derived scenes relation DB according to the second exemplary embodiment of the present invention.

FIG. 8 is a diagram showing a third configuration of the typical-derived scenes relation DB according to the second exemplary embodiment of the present invention.

FIG. 9A is a diagram showing a concept of a first restructuring of the typical-derived scenes relation DB according to a third exemplary embodiment of the present invention.

FIG. 9B is a diagram showing a concept of a second restructuring of the typical-derived scenes relation DB according to the third exemplary embodiment of the present invention.

FIG. 10 is a flowchart showing a process for restructuring the typical-derived scenes relation DB according to the third exemplary embodiment of the present invention.

FIG. 15 is a flowchart showing a process of restructuring the typical-derived scenes relation DB according to the fourth exemplary embodiment of the present invention.

FIG. 16 is a diagram showing a configuration of a content-metadata DB according to a fifth exemplary embodiment of the present invention.

FIG. 17 is a flowchart showing a process of acquiring a content and metadata according to the fifth exemplary embodiment of the present invention.

DESCRIPTION OF EMBODIMENTS

Hereinafter, an exemplary embodiment of the present invention will be described in detail with reference to drawings. However, components in the following exemplary embodiment are shown for illustrative purpose only and there is no intention that a technological scope of the present invention is limited to only the components. Here, in this specification, a word of 'agreement' is used as being approximately identical, and a word of 'coincidence' is used as being exactly identical.

[First Exemplary Embodiment]

A video processing apparatus 100 according to a first exemplary embodiment of the present invention will be described with reference to FIG. 1. The video processing apparatus 100 verifies a plurality of pieces of video data by determining whether scenes, each of which includes a series of plural frames, agree or not.

Figure 1:
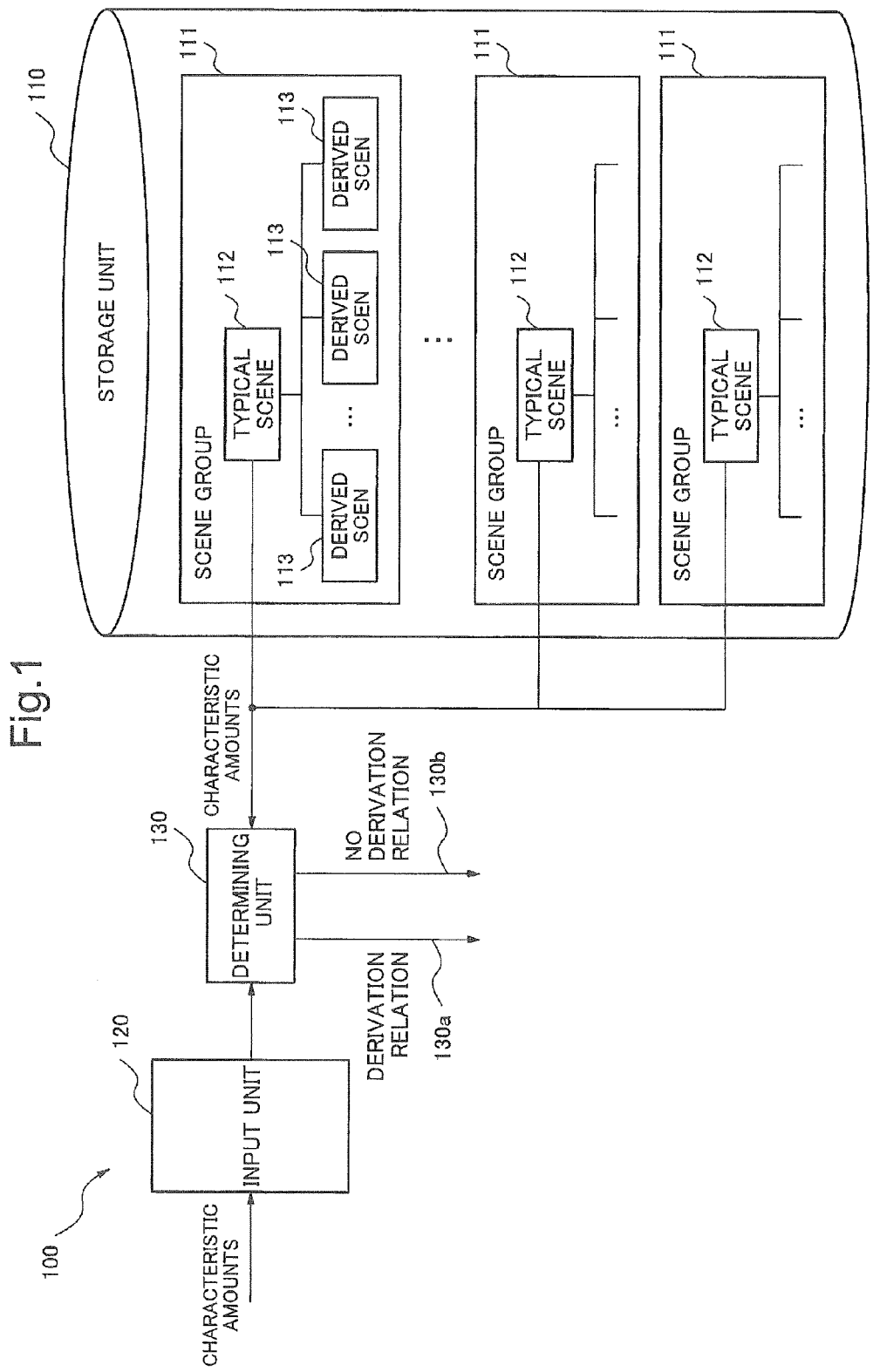
FIG. 1 is a block diagram showing a configuration of a video processing apparatus according to a first exemplary embodiment of the present invention.

As shown in FIG. 1, the video processing apparatus 100 includes a storage unit 110, an input unit 120 and a determining unit 130. The storage unit 110 stores a plurality of scenes and characteristic amounts which are extracted from a series of plural frames included in the respective scenes in a scene group 111, in association with each other, defining one scene of the scene group 111 as a typical scene 112 and the other scenes as a derived scene 113, respectively. Here, the plurality of scenes derived from a common scene are defined as the scene group 111. The input unit 120 inputs a characteristic amount extracted from each frame of a new scene. The determining unit 130 determines whether the new scene represented by the inputted characteristic amount is the derived scene of the scene group 111 (130a) or not (130b) by verifying the inputted characteristic amount with the characteristic amount of the typical scene 112 of the scene group 111 stored in the storage unit 110.

According to the exemplary embodiment, it is possible to verify the video data at a high speed with less resources.

[Second Exemplary Embodiment]

In a second exemplary embodiment, a frame characteristic amount of video data sent from various servers and video viewing terminals, which include a frame characteristic amount extracting unit, is stored in a database of a video processing apparatus, which has a configuration able to be searched, with a structured derivation relation between scenes. According to the exemplary embodiment, it is possible to generate a video processing database used for verifying at a high speed with less resources, on the basis of video data sent from various servers and video viewing terminals. Accordingly, it is possible to verify video data at a high speed with less resources.

In the following exemplary embodiment, a case that frame characteristic amounts are used as a characteristic amount of a scene including a series of the frames will be described. However, the characteristic amount to be used is not limited to the frame characteristic amounts, and another characteristic amount is also applicable.

<<Configuration of Video Processing System>>

FIG. 2A is a block diagram showing a configuration of the video processing system according to the exemplary embodiment. Note that, FIG. 2A shows a functional unit related to a function of the exemplary embodiment, and a functional unit for realizing another function is omitted from the figure in order to avoid complexity.

A reference sign 210 in FIG. 2A indicates a video processing apparatus. The video processing apparatus 210 includes a frame characteristic amount DB 217 which stores a frame characteristic amount characterizing each frame of a video content, in association with a relation between scenes each of which includes a series of frames. The frame characteristic amount DB 217 includes a typical-derived scenes relation DB 217-1 which stores a relation between a typical scene and a derived scene with a structure for permitting search of the relation (refer to FIG. 5A, FIG. 7 and FIG. 8). Moreover, the frame characteristic amount DB 217 includes an anteroposterior scenes relation DB 217-2 which stores connection between a preceding scene and the following scene (refer to FIG. 5B). Moreover, the frame characteristic amount DB 217 includes a concatenation scenes relation DB 217-3 which stores an order of concatenation among the plurality of scenes, in association with a division of one scene into the plurality of scenes (refer to FIG. 5C). The concatenation scenes relation DB 217-3 keeps the concatenation relation among the scenes in one video content.

The frame characteristic amount DB 217 stores the frame characteristic amount of each scene which has been already inputted with the structure associated with the relation between scenes. In the frame characteristic amount DB 217, scenes among which a difference of characteristic amounts is equal to or smaller than a predetermined threshold value are defined as a member of a scene group. The scene group includes one typical scene and derived scenes which are other than the typical scene. Here, the typical scene is a scene inputted first in the scene group. Note that, as will be described in a third exemplary embodiment, the scene group is restructured considering a generated date of each scene or a distance between frame characteristic amounts of scenes.

The video processing apparatus 210 includes a communication control unit 211 which communicates with each server and each video viewing terminal through a network 270. Note that, wire communication or wireless communication may be applied. A video content frame characteristic amount storing unit 212 stores a series of frame characteristic amounts of a video content received by the communication control unit 211. A frame characteristic amount agreement condition storing unit 213 stores a verifying condition which is used by a frame characteristic amount verifying unit 214. The frame characteristic amount verifying unit 214 verifies a frame characteristic amount 217a of each scene, which have been already stored with the structure in the frame characteristic amount DB 217, with a frame characteristic amount 212a which is stored in the video content frame characteristic amount storing unit 212, by use of the verifying condition stored in the characteristic amount agreement condition storing unit 213. Then, the frame characteristic amount verifying unit 214 outputs a verifying result 214a, which indicates agreement or no agreement, to a frame characteristic amount storing control unit 216. Moreover, the frame characteristic amount verifying unit 214 outputs a verifying result 214b, which indicates an agreement with a portion of the typical scene, to a scene dividing unit 215. Note that, a part indicated by a dotted line 219, which has the frame characteristic amount agreement condition storing unit 213 and the frame characteristic amount verifying unit 214, includes a first portion which determines whether there is an agreed scene group or not and a second portion which determines whether to be added to the scene group or not (refer to FIG. 2B), by verifying with the typical scene.

In case that the frame characteristic amount verifying unit 214 determines that a series of received frame characteristic amounts agrees with a portion of the frame characteristic amounts of the typical scene which have been already stored with the structure in the frame characteristic amount DB 217, the scene dividing unit 215 divides an agreed portion from the existing typical scene as a new scene. Then, the scene dividing unit 215 outputs a division result 215a to the frame characteristic amount storing control unit 216 for restructuring of the frame characteristic amount DB 217 based on the scene division. A portion excluding the new scene from the frame characteristic amount of the existing typical scene is also stored in the frame characteristic amount DB 217 as a new scene. Furthermore, a portion, which does not agree with the frame characteristic amounts of the existing typical scene, out of the series of received frame characteristic amounts, is also registered as a new typical scene. Accordingly, the scene structure of the frame characteristic amount DB 217 is also restructured according to the division of one scene to a plurality of scenes, which is carried out by the scene dividing unit 215. The frame characteristic amount storing control unit 216 receives the verifying result outputted from the frame characteristic amount verifying unit 214 and the division result outputted from the scene dividing unit 215, and carries out storage control on the frame characteristic amount DB 217 to update or restructure the structure (refer to FIG. 2C). A search control unit 218 searches for a scene which agrees with received frame characteristic amounts, a derivation relation regarding the scene, and a relation regarding the video content from the frame characteristic amount DB 217 which is structured with frame characteristic amounts of scenes, and sends the search result to a search requestor.

A reference sign 220 in FIG. 2A indicates a video contents storing server which stores video contents. The video contents storing server 220 includes a frame characteristic amount extracting unit 220a, and sends frame characteristic amounts in case of sending a video content to the video processing apparatus 210. A reference sign 230 in FIG. 2A indicates a video content providing server which provides the video content to video viewing terminals 260 to 26n. The video content providing server 230 includes a frame characteristic amount extracting unit 230a, and sends frame characteristic amounts in case of sending the video content to the video processing apparatus 210. A reference sign 240 in FIG. 2A indicates a video content generating server which generates the video content. The video content generating server 240 includes a frame characteristic amount extracting unit 240a, and sends frame characteristic amounts in case of sending the video content to the video processing apparatus 210. A reference sign 250 in FIG. 2A indicates a video contents crawling server which crawls video contents. The video contents crawling server 250 includes a frame characteristic amount extracting unit 250a, and sends frame characteristic amounts in case of sending a video content to the video processing apparatus 210.

Each of the reference signs 260 to 26n in FIG. 2A indicates the video viewing terminal for viewing the video content. The video viewing terminals 260 to 260n include frame characteristic amount extracting units 260a to 26na respectively. In case of downloading the video content from the above-mentioned video contents storing server 220, the video content providing server 230, and the video content generating server 240 to view the video content, the video viewing terminals 260 to 260n make the frame characteristic amount extracting units 260a to 26na generate frame characteristic amounts and send the frame characteristic amounts to the video processing apparatus 210. Moreover, a video viewing apparatus for playing a video content and recording and playing a broadcasted program, also includes a frame characteristic amount extracting unit, and sends frame characteristic amounts to the video processing apparatus 210 when playing the video content.

Note that, the video content whose frame characteristic amounts are received by the video processing apparatus 210 is not limited to the above and may be a video content delivered through any media in the world. Moreover, the frame characteristic amount extracting units 260a to 26na may be manufactured on one chip IC circuit, and mounted on each terminal or each apparatus. Or, if being configured in such a way that a program for extracting frame characteristic amounts is downloaded to each terminal or each apparatus, it is possible to carry out a common process which uses a standardized frame characteristic amount.

<<Details of Each Functional Unit>>

Hereinafter, functional units which realize main functions in the exemplary embodiment will be described in more detail.

(Frame Characteristic Amount Verifying Unit)

FIG. 2B is a block diagram showing an internal configuration of the frame characteristic amount verifying unit 214 according to the exemplary embodiment. Note that, as indicated by the dotted line 219, the frame characteristic amount agreement condition storing unit 213 is also associated with the frame characteristic amount verifying unit 214.

The frame characteristic amount verifying unit 214 includes a first frame characteristic amount verifying part 214-1 which verifies received frame characteristic amounts with a typical scene in the frame characteristic amount DB 217, and a second frame characteristic amount verifying part 214-2 which verifies the received frame characteristic amounts with a frame characteristic amount of each scene in a scene group including an agreed typical scene and the derived scene thereof. The first frame characteristic amount verifying part 214-1 performs the verification on the basis of a frame characteristic amount agreement condition 213-1. Meanwhile, the second frame characteristic amount verifying part 214-2 performs the verification on the basis a frame characteristic amount coincidence condition 213-2. Here, since the frame characteristic amount agreement condition 213-1 is used as a determining condition whether there is an agreed frame characteristic amount of a scene in a scene group, the frame characteristic amount agreement condition 213-1 is more lax than the frame characteristic amount coincidence condition 213-2 which is used as a determining condition whether there is a coincident frame characteristic amount of a scene in a scene group.

The received frame characteristic amounts of a video content are firstly verified with typical scenes in turn by the frame characteristic amount verifying part 214-1 on the basis of the frame characteristic amount agreement condition 213-1. In case that there is not an agreed typical scene in the verification with typical scenes, a typical scene addition 214a-1 is outputted and stored in the frame characteristic amount DB 217 as a new typical scene, then the process is ended. On the other hand, in case that there is an agreed typical scene, next, the received frame characteristic amounts of the video content are verified with frame characteristic amounts of each scene in the scene group including the agreed typical scene in turn by the frame characteristic amount verifying part 214-2 on the basis of the frame characteristic amount agreement condition 213-3. In case that there is a coincident scene, as a result of the verification, new registration to the frame characteristic amount DB 217 is not carried out. On the other hand, in case that there is not a coincident scene, an derived scene addition 214a-2 is outputted and registered to a corresponding scene group in the frame characteristic amount DB 217, as a new derived scene, in association with the typical scene. Furthermore, in case of agreeing with only a portion of the frame characteristic amounts of a typical scene, a division instruction 214b is outputted to the scene dividing unit 215 so that the scene dividing unit 215 divides the scene into an agreed portion and the other portion.

As mentioned above, the received frame characteristic amounts of the video content are verified firstly with the frame characteristic amounts of typical scenes. Then, registration as a new typical scene, or incorporation into a scene group is selected. For this reason, a large number of processes, which are required in case of the verification with frame characteristic amounts of every scene, is decreased.

(Scene Dividing Unit)

FIG. 2C is a block diagram showing an internal configuration of the scene dividing unit 215 according to the exemplary embodiment.

In FIG. 2C, the scene dividing unit 215 includes a video content frame characteristic amount storing part 215-1 which stores frame characteristic amounts of a video content 212a received from the video content frame characteristic amount storing unit 212. Moreover, the scene dividing unit 215 includes a typical scene frame characteristic amount storing part 215-2 which stores frame characteristic amounts of a typical scene 217a which is received from the frame characteristic amount DB 217. The scene dividing unit 215 receives the division instruction 214b, which indicates an agreement with only a portion of the received frame characteristic amounts of the video content, from the frame characteristic amount verifying unit 214.

The scene dividing unit 215 generates four scenes according to the division instruction 214b. Scenes 215a-1 and 215a-2 are divided from the frame characteristic amounts of the typical scene. Scenes 215a-3 and 215a-4 are divided from the frame characteristic amounts of the video content. The scenes 215a-1 to 215a-4 are corresponding to the division result 215a in FIG. 2A. Here, it is assumed that the scene 215a-1 and the scene 215a-3 agree each other, and the scene 215a-2 and the scene 215a-4 do not agree each other. In this case, if the scene 215a-1 and the scene 215a-3 are coincident each other, the scene 215a-1 and the scene 215a-3 are registered as one new typical scene. If the scene 215a-1 and the scene 215a-3 are not coincident each other, the scene 215a-1 and the scene 215a-3 are registered as the typical scene and the derived scene in the same scene group. While either the scene 215a-1 or the scene 215a-3 may be registered as a typical scene, in the exemplary embodiment, the scene divided from the existing typical scene is registered as the typical scene. The scene 215a-2 and scene 215a-4 are registered as a new typical scene. Note that, the scene 215a-2 and the scene 215a-4 may be verified again with frame characteristic amounts of each scene in the frame characteristic amount DB 217, and restructuring for collecting scenes which belong to the same scene group may be carried out.

While FIG. 2C exemplifies that one typical scene is divided into two typical scenes, that is, a preceding scene and a following scene, one typical scene may be divided into three typical scenes if an agreed portion of the frame characteristic amounts is located at a middle of the typical scene. Furthermore, if there are a plurality of agreed portions of the frame characteristic amount, number of the divided scenes may be increased. However, since quite a large number of short typical scenes are generated if the typical scene is divided on the basis of a slight difference, a number of the typical scenes and a length of the typical scene may be adjusted by changing the agreement condition. In case of changing the agreement condition, even if there is a non-coincident portion in a part of the series of scenes, it may be determined that the series of scenes agrees as a whole by adjusting a threshold value which is used for determining the agreement. Moreover, it may be determined that the series of scenes agrees as a whole by adjusting a parameter which indicates a permissible period of time in second against mingle of a short scene which is not coincident. Or, both of adjusting the threshold value and adjusting the parameter may be applied.

(Frame Characteristic Amount Storing Control Unit)

Figure 2D:
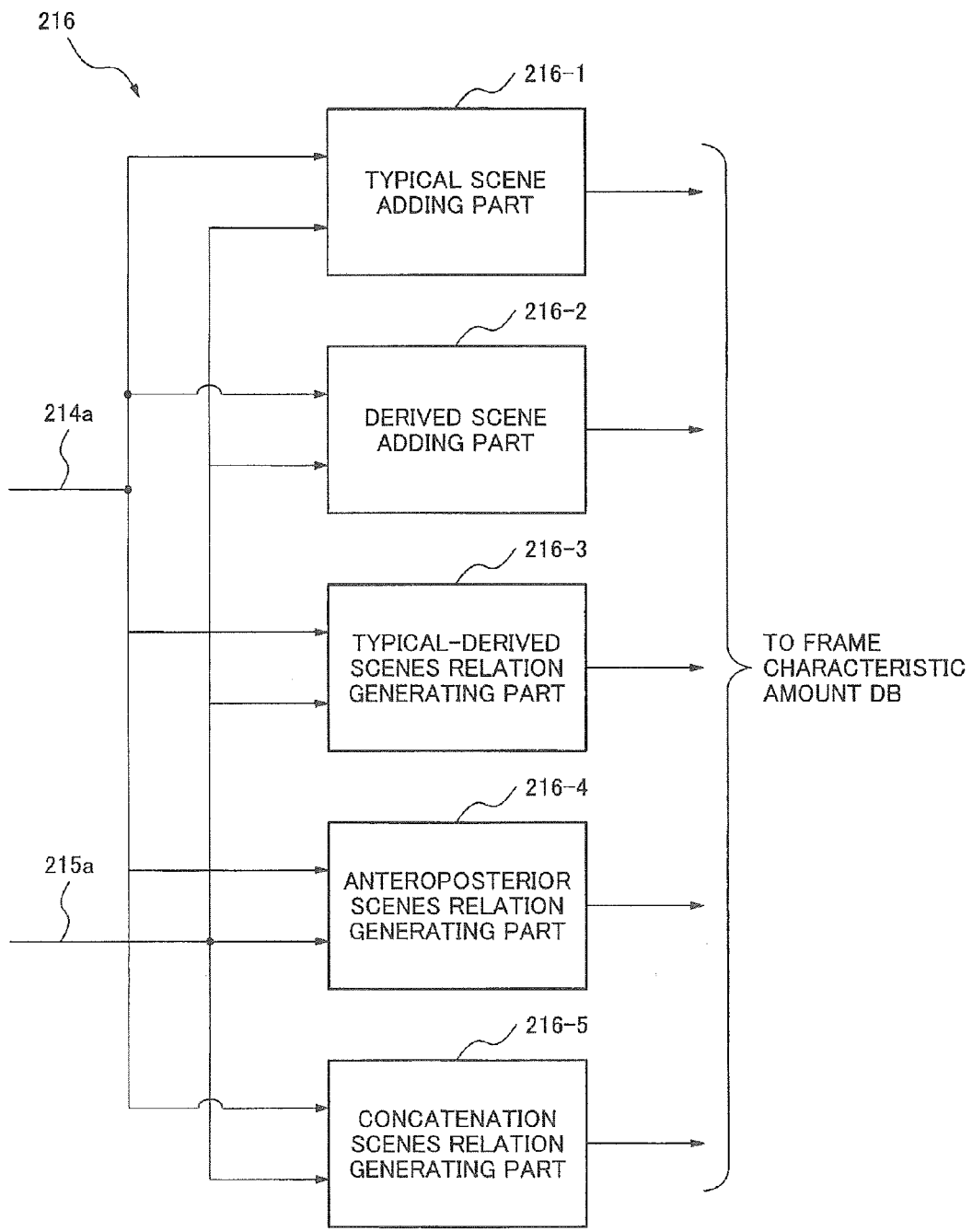
FIG. 2D is a block diagram showing an internal configuration of a frame characteristic amount storing control unit according to the second exemplary embodiment of the present invention.

FIG. 2D is a block diagram showing an internal configuration of the frame characteristic amount storing control unit 216 according to the exemplary embodiment.

The verifying result 214a is inputted to the frame characteristic amount storing control unit 216 from the frame characteristic amount verifying unit 214. Moreover, the division result 215a is inputted to the frame characteristic amount storing control unit 216 from the scene dividing unit 215. The frame characteristic amount storing control unit 216, which includes the following functional units, sends control information used for carrying out each process to the frame characteristic amount DB 217 on the basis of the verifying result 214a and the division result 215a.

A typical scene adding part 216-1 adds a structured new typical scene to the typical-derived scenes relation DB 217-1 of the frame characteristic amount DB 217, on the basis of the output of the typical scene addition 214a-1 from the frame characteristic amount verifying unit 214 and the output of the division result 215a from the scene dividing unit 215. A derived scene adding part 216-2 adds a structured new derived scene to the typical-derived scenes relation DB 217-1 of the frame characteristic amount DB 217, on the basis of the output of the derived scene addition 214a-2 from the frame characteristic amount verifying unit 214 and the output of the division result 215a from the scene dividing unit 215. A typical-derived scenes relation generating part 216-3, when adding a new typical scene and a new derived scene, generates a relation between a typical scene and a derived scene, and updates the typical-derived scenes relation DB 217-1 (refer to FIG. 5A). An anteroposterior scenes relation generating part 216-4, when adding a new typical scene and a new derived scene, generates a new relation between preceding and following scenes, and updates the anteroposterior scenes relation DB 217-2 (refer to FIG. 5B). A concatenation scenes relation generating part 216-5, when adding a new typical scene and a new derived scene, generates a new relation between concatenated scenes, and updates the concatenation scenes relation DB 217-3 (refer to FIG. 5C).

(Frame Characteristic Amount Extracting Unit)

Figure 3A:
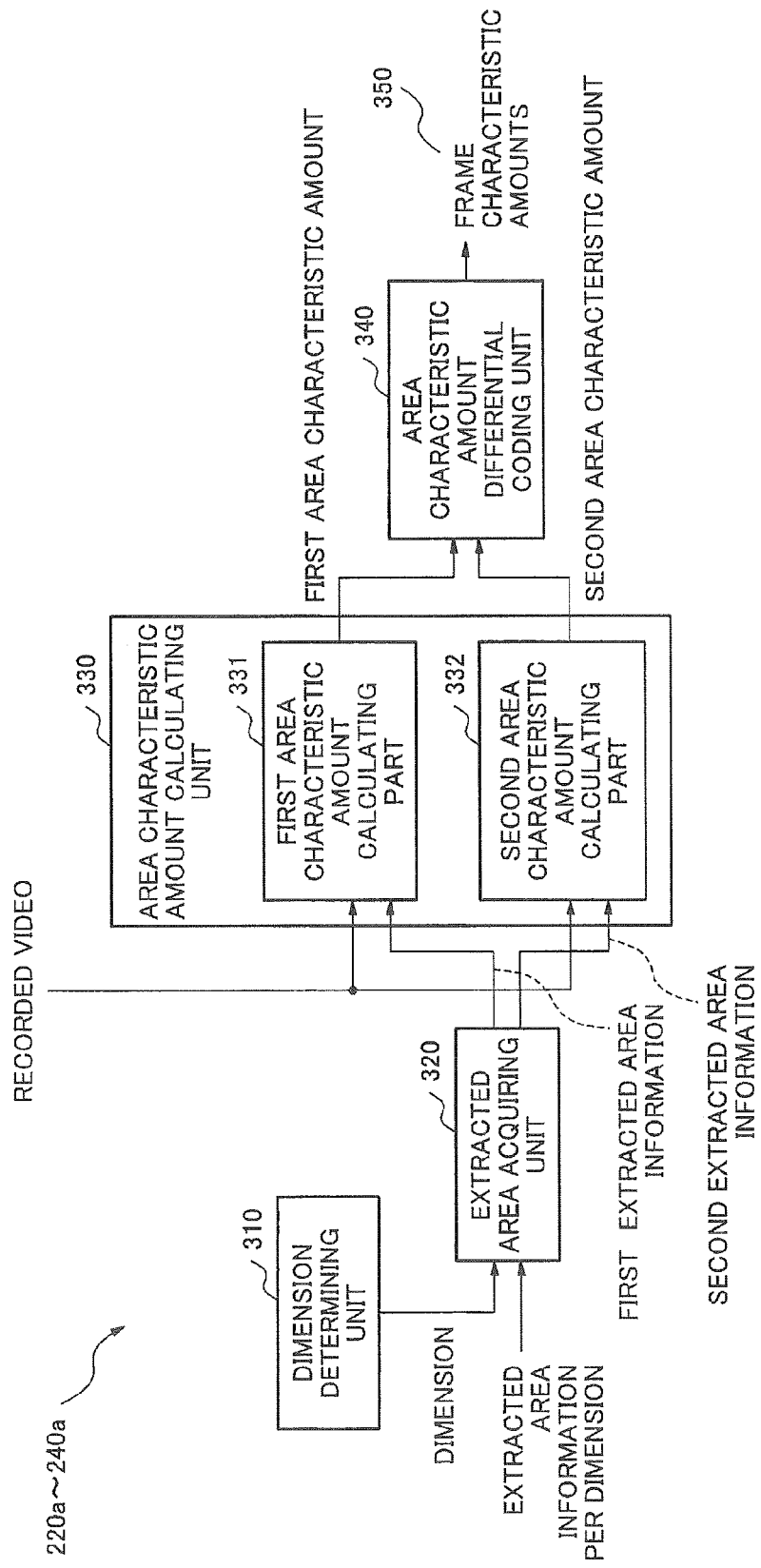
FIG. 3A is a block diagram showing a configuration of a frame characteristic amount extracting unit according to the second exemplary embodiment of the present invention.

FIG. 3A is a block diagram showing a configuration of the frame characteristic amount extracting units 220a to 26na according to the exemplary embodiment. The characteristic amount extracting units 220a to 26na applied in the exemplary embodiment are functional units each of which extracts a video signature adopted in the standardization of MPEG 7.

In FIG. 3A, an outputted frame characteristic amount 350 is obtained by arranging many pairs of areas, whose sizes and shapes are different each other, in each frame image of a recorded video data, quantizing (actually, three values quantization) a difference of average brightness values which are a kind of an area characteristic amount between these areas, and coding the quantized difference. A dimension determining unit 310 determines number of pairs of areas. One dimension corresponds to one pair of areas. An extracted area acquiring unit 320 acquires pairs of areas of each dimension, whose frame characteristic amounts will be calculated, according to the determination of the dimension determining unit 310. An area characteristic amount calculating unit 330 includes a first area characteristic amount calculating part 331 and a second area characteristic amount calculating part 332. The first area characteristic amount calculating part 331 calculates average brightness of one area included in a pair of areas of each dimension, and the second area characteristic amount calculating part 332 calculates average brightness of the other area included in the pair of areas. An area characteristic amount differential coding unit 340 calculates a difference between the average brightness values of the pair of areas, and carries out the quantum coding to the difference according to a threshold value and outputs a frame characteristic amount 350.

Note that, while the exemplary embodiment will be described hereinafter by use of average brightness as an area characteristic amount, the area characteristic amount is not limited to the average brightness of the area. As the area characteristic amount, a value obtained by other processing of brightness or a frame characteristic amount other than brightness may be applied.

FIG. 3B is a diagram showing a process carried out by the frame characteristic amount extracting units 220a to 26na according to the exemplary embodiment.

A reference sign 320a in FIG. 3B exemplifies a pair of areas acquired by the extracted area acquiring unit 320 shown in FIG. 3A. In 320a, an outer rectangle indicates a frame, and each inner rectangle indicates an area.

A reference sign 330a in FIG. 3B indicates a pair of areas acquired by the extracted area acquiring unit 320 and a relation between the areas for which a difference is calculated. An arrow connecting centers of each of the areas indicates calculating a difference of average brightness values of pixels of individual areas, between two areas extracted in the frame image.

A reference sign 340a in FIG. 3B indicates a result of the quantum coding of the calculated difference. According to 340a, if a difference obtained by subtracting a characteristic amount of the second area from a characteristic amount of the first area is within the threshold value, which is a range having '0' as a center value (corresponding to a case that average brightness values are equal) indicated by dotted lines, '0' is set to an output value of the quantum coding. If the difference is a positive (+) value and is greater than a value of the right side dotted line, '+1' is set to the output value of the quantum coding. If the difference is a negative (−) value and is smaller than a value of the left side dotted line, '−1' is set to the output value of the quantum coding. An object to adopt the three values ('−1', '0' and '+1') coding is to make it easy to separate the frame characteristic amount, and to reduce number of calculations for verifying the frame characteristic amount, by making the dimensions as much as possible. Accordingly, the output value of the quantum coding is not limited to the above-mentioned example using the three values. Here, the threshold value indicated by the dotted line is determined on the basis of a ratio of number of the differential values quantized to '0', to number of the distributed differential values of all dimensions which are used. As an example, the threshold value is determined in such a way that the ratio of the number of the differential values quantized to '0' is 50%.

A reference sign 350a in FIG. 3B indicates an example of the frame characteristic amount which is generated by collecting the results of the quantum coding of the difference. As a simple example of the frame characteristic amount, values obtained by the quantum coding of the difference are arranged in one dimensional direction in an order of the dimension. Note that, the frame characteristic amount is not limited to the example that the values obtained by the quantum coding of the difference are arranged simply in one dimensional direction in the order of the dimension. The values may be arranged in multiple dimensional directions, and furthermore an additional calculation may be carried out.

Figure 3C:
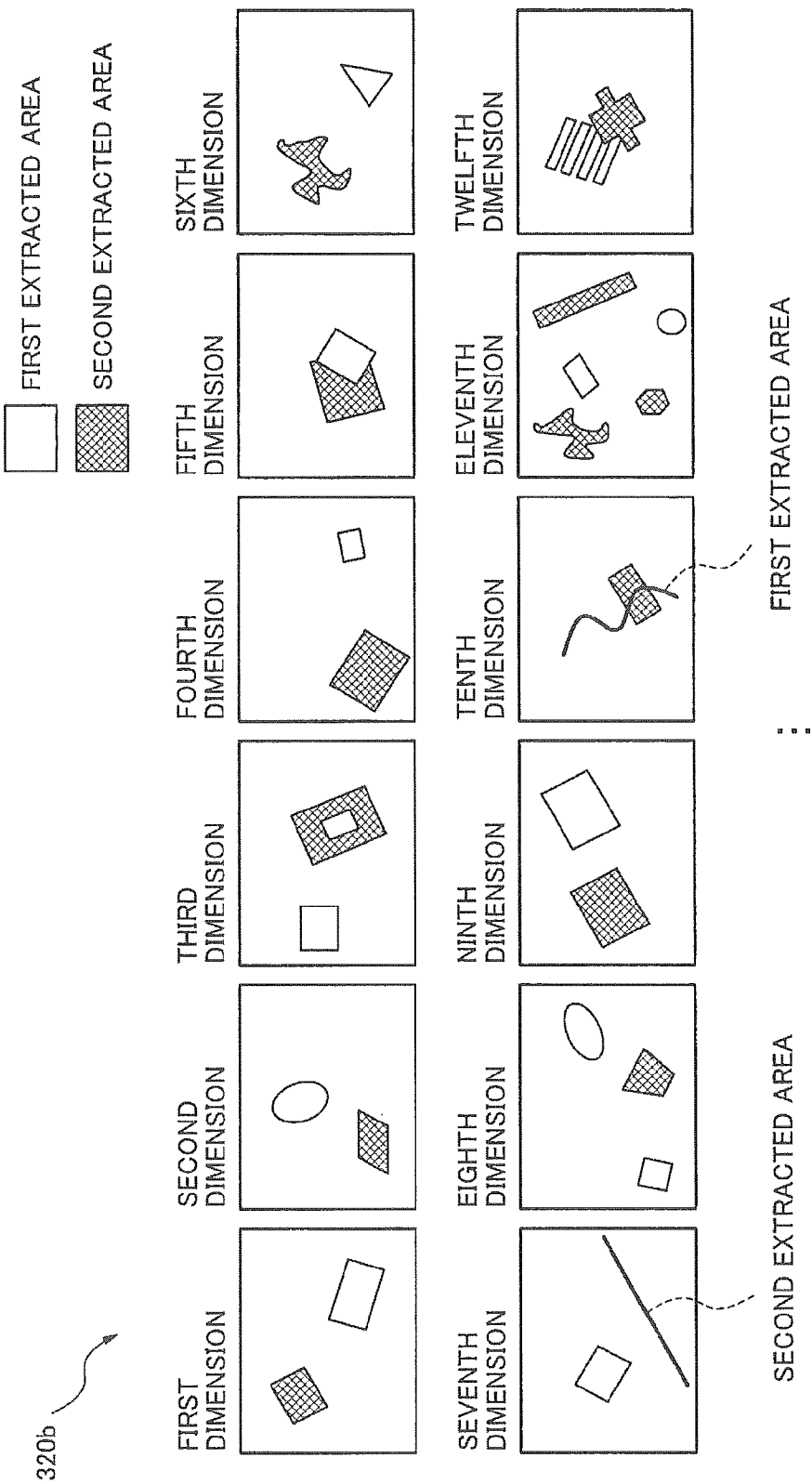
FIG. 3C is a diagram showing extracted areas in the frame characteristic amount extracting unit according to the second exemplary embodiment of the present invention.

FIG. 3C is a diagram showing extracted areas which are extracted by the frame characteristic amount extracting units 220a to 26na according to the exemplary embodiment.

According to 320a in FIG. 3B, a pair of areas of each dimension is indicated by two rectangular areas. However, in order to calculate the frame characteristic amount which expresses the frame appropriately, a shape other than the rectangle may be preferable in some cases. The extracted area shown in FIG. 3C exemplifies a pair of areas each of which is not the rectangular area. By making each dimension quantized to three values as indicated with the reference sign 350a in FIG. 3B, it is possible to set several hundred dimensions even in case of realizing a real-time verification of frame characteristic amounts, and a verification of a group of frame characteristic amounts of a video content which is a set of the frame characteristic amounts.

<<Configuration of Video Processing Apparatus>>

Figure 4:
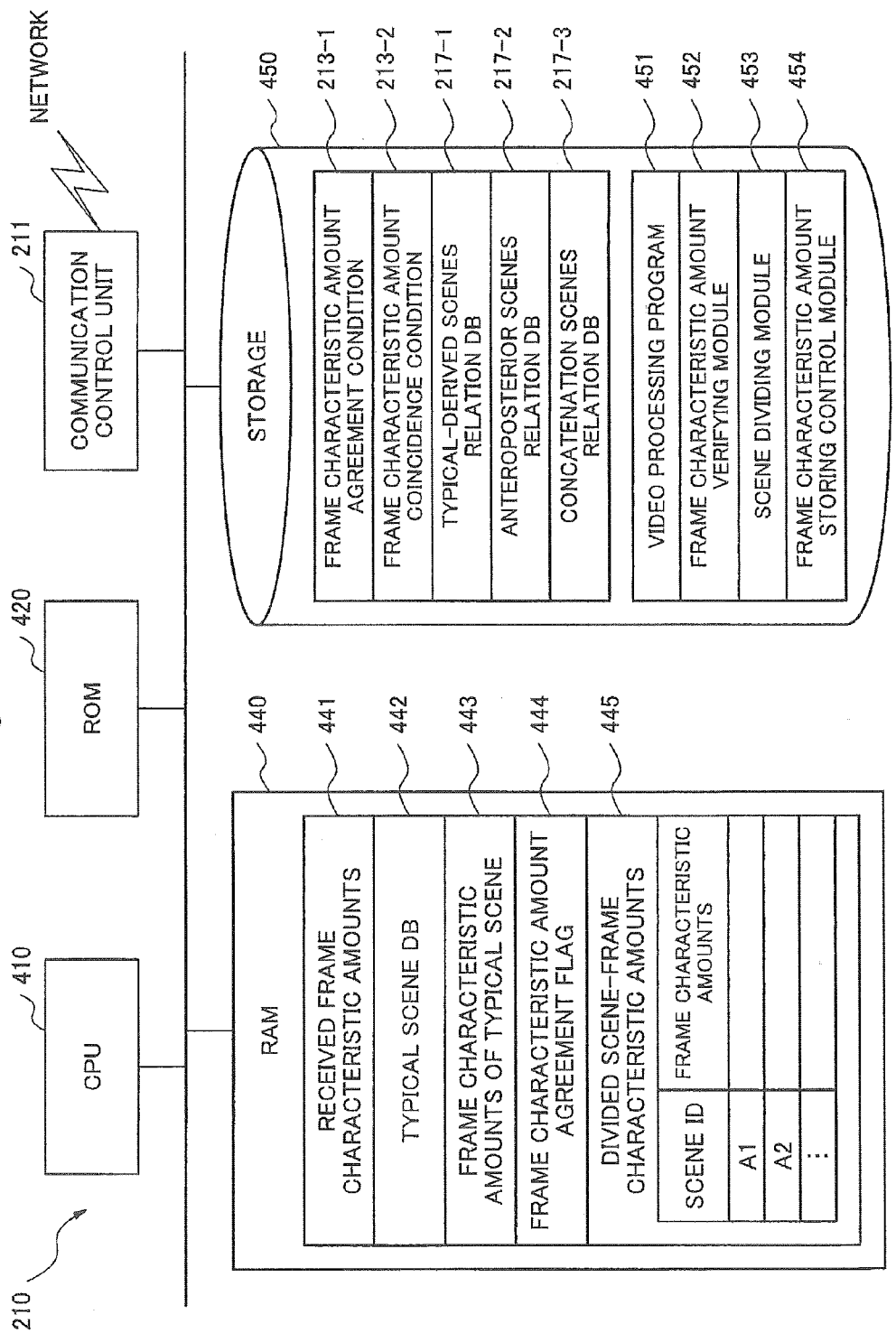
FIG. 4 is a block diagram showing a configuration of a video processing apparatus according to the second exemplary embodiment of the present invention.

FIG. 4 is a block diagram showing a configuration of the video processing apparatus 210 according to the exemplary embodiment.

In FIG. 4, CPU (Central Processing Unit) 410, which is a processor for controlling a calculation, realizes each functional unit shown in FIG. 2 by executing a program. ROM (Read Only Memory) 420 stores fixed data such as initial data and an initialize program, and a program. The communication control unit 211 communicates with the video viewing terminals 260 to 26n or the servers 220 to 250. Here, wireless or wired communication may be applied.

RAM (Random Access Memory) 440 is a random access memory used by CPU 410 as a work area for temporary storage. An area to store data required for realization of the exemplary embodiment is reserved in RAM 440. A reference sign 441 indicates received frame characteristic amounts which are received from a sender and has been converted into the frame characteristic amounts. A reference sign 442 indicates a typical scene ID identifying a typical scene which is read from the frame characteristic amount DB 217, and is verified with the received frame characteristic amounts 441. A reference sign 443 indicates frame characteristic amounts related to the typical scene ID 442. A reference sign 444 indicates a frame characteristic amount agreement flag which indicates whether the received frame characteristic amounts and the frame characteristic amounts of the typical scene agree each other or not. Note that, the following is not shown in FIG. 4 since it becomes complicated. That is, the frame characteristic amount agreement flag 444 indicates whether the received frame characteristic amount agrees with the frame characteristic amount of the typical scene or not, and whether the received frame characteristic amount is coincident with the frame characteristic amount of a scene included in the scene group. A reference sign 445 indicates divided scene-frame characteristic amounts which stores frame characteristic amounts of divided scenes in association with the divided scenes. The divided scene-frame characteristic amounts 445 is a table which stores, in case that a scene 'A' is divided into 'A1' and 'A2', for example, respective frame characteristic amounts and scene IDs in association with each other.

A storage 450 stores database contents, various parameters, or following data and program which are necessary to realize the present exemplary embodiment. The reference sign 213-1 indicates the frame characteristic amount agreement condition shown in FIG. 2B. The reference sign 213-2 indicates the frame characteristic amount coincidence condition. The reference sign 217-1 indicates the typical scene-derived scene relation DB in the frame characteristic amount DB 217 (refer to FIG. 5A). The reference sign 217-2 indicates the anteroposterior scenes relation DB in the frame characteristic amount DB 217 (refer to FIG. 5B). The reference sign 217-3 indicates the concatenation scenes relation DB in the frame characteristic amount DB 217 (refer to FIG. 5C). In the storage 450, the following programs are stored. A reference sign 451 indicates a video processing program which makes a whole of processes executed. A reference sign 452 indicates a frame characteristic amount verifying module which verifies frame characteristic amounts in the video processing program 451. A reference sign 453 indicates a scene dividing module which divides a scene. A reference sign 454 indicates a frame characteristic amount storing control module which controls storing the frame characteristic amount in the frame characteristic amount DB 217 in the video processing program 451.

Note that, FIG. 4 shows only data and programs which are essential in the exemplary embodiment, and does not show general-purpose data and programs such as OS.

(First Configuration of Typical-Derived Scenes Relation DB)

FIG. 5A is a diagram showing a first configuration 217-1A of the typical-derived scenes relation DB 217-1 according to the exemplary embodiment.

The first configuration 217-1A shown in FIG. 5A includes a typical scene DB 510, a scenes relation DB 520 and a derived scene DB 530. The typical scene DB 510 stores a series of frame characteristic amounts 511 and a typical scene ID 512 which identifies a scene in association with each other. The scenes relation DB 520 stores, in association with a typical scene ID 521 corresponding to the typical scene ID 512 in the typical scene DB 510, derived scene IDs 522 included in the scene group. The derived scene DB 530 stores a derived scene ID 531 corresponding to the derived scene ID 522 in the scenes relation DB 520 and a series of frame characteristic amounts 532 in association with each other. By the above-mentioned configuration, the frame characteristic amounts related to the typical scene ID and the frame characteristic amounts related to the derived scene ID are associated.

(Anteroposterior Scenes Relation DB)

Figure 5B:
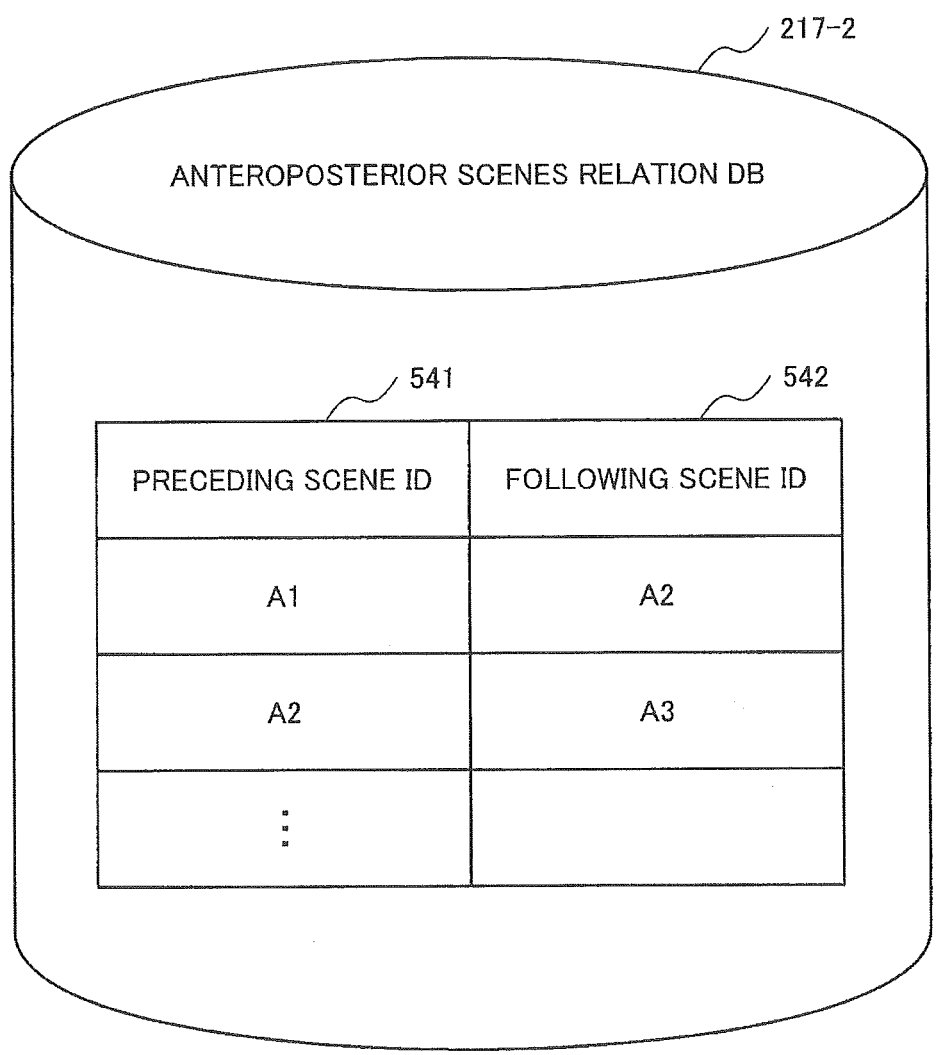
FIG. 5B is a diagram showing an anteroposterior scenes relation DB according to the second exemplary embodiment of the present invention.

FIG. 5B is a diagram showing the anteroposterior scenes relation DB 217-2 according to the exemplary embodiment.

The anteroposterior scenes relation DB 217-2 in FIG. 5B stores a connection relation corresponding to a relation between a preceding scene and a following scene, with a preceding scene ID 541 and a following scene ID 542 in association with each other. Note that, the anteroposterior scenes relation DB 217-2 is applied, in case finding out the next typical scene after finding out the first typical scene out of successive scenes, to searching from a typical scene associated by the successive scene IDs preferentially in order to find the next typical scene in a short time. As a result, the anteroposterior scenes relation DB contributes toward high speed search.

(Concatenation Scenes Relation DB)

FIG. 5C is a diagram showing the concatenation scenes relation DB 217-3 according to the exemplary embodiment.

The concatenation scenes relation DB 217-3 shown in FIG. 5C stores an order of a successive series of group scenes by use of an elemental scene ID stream 552 and scene lengths 553 of the respective scenes in association with a group scene ID 551. Note that, a character 's' used in the scene lengths means a second. It is obvious to reach to one video content finally by concatenating the group scene IDs furthermore as one elemental scene ID.

<<Processes Carried Out by Video Processing Apparatus>>

FIG. 6A is a flowchart showing a process carried out by the video processing apparatus according to the exemplary embodiment. The flowchart is carried out by CPU 410 using RAM 440 to realize each functional unit shown in FIGS. 2A to 2D. Note that, while there is no clear one to one correspondence between the flowchart and each functional unit, the flowchart shown in FIG. 6A includes the process carried out by each module shown in FIG. 4.

In Step S601, frame characteristic amounts of a video content are inputted. In Step S603, the frame characteristic amount verifying unit 214 verifies a scene included in the video content with all typical scenes, in turn. In Step S605, the frame characteristic amount verifying unit 214 determines whether the scene included in the video content agrees with a typical scene, on the basis of the frame characteristic amount agreement condition 213-1. In case that there is no portion which agrees with the typical scene, in Step S607, the frame characteristic amount storing control unit 216 registers the scene included in the video content as a new typical scene to the structure of the frame characteristic amount DB 217. In case that a typical scene and the scene included in the video content agrees entirely, in Step S609, the scene dividing unit 215 carries out a detailed scene classifying process (refer to FIG. 6). In case that a typical scene and a portion of the scene included in the video content agrees, in Step S611, the scene dividing unit 215 divides scenes into portions which agree, and portions which do not agree to generate new typical scenes. In Step S613, the frame characteristic amount storing control unit 216 restructures the frame characteristic amount DB 217 on the basis of the new typical scenes generated by dividing.

(Detailed Scene Classifying Process)

FIG. 6B is a flowchart showing a process Step 609-1 which is corresponding to the detailed scene classifying process Step S609, according to the exemplary embodiment.

In Step S621, the frame characteristic amount verifying unit 214 determines whether a series of frame characteristic amounts of the video content is perfectly coincident with the frame characteristic amounts of the typical scene, on the basis of the frame characteristic amount coincidence condition 213-2. In case of perfectly coincident, in Step S623, the frame characteristic amount storing control unit 216 associates the scene of the video content with the typical scene. Here, the typical-derived scenes relation DB 217-1 in the frame characteristic amount DB 217 is not updated since there is no change. However, if there is a new relation, the new relation is added to the anteroposterior scenes relation DB 217-2 or the concatenation scenes relation DB 217-3. In case of not being perfectly coincident with the frame characteristic amounts of the typical scene, proceeded to Step S625.

In Step S625, the frame characteristic amount verifying unit 214 determines whether there is a derived scene having the frame characteristic amounts which are perfectly coincident with a series of frame characteristic amounts of the video content in the scene group or not. In case that there is a derived scene having the frame characteristic amounts which are perfectly coincident, in Step S627, the frame characteristic amount storing control unit 216 associates the scene of the video content with the derived scene. Here, the typical-derived scenes relation DB 217-1 in the frame characteristic amount DB 217 is not updated since there is no change. However, if there is a new relation, the new relation is added to the anteroposterior scenes relation DB 217-2 or the concatenation scenes relation DB 217-3. In case that there is not a derived scene having the frame characteristic amounts which are perfectly coincident, proceeded to Step S629.

In Step S629, the frame characteristic amount storing control unit 216 registers the scene of the video content to the scene group as a new derived scene. Here, if there is a new relation, the new relation is added to the anteroposterior scenes relation DB 217-2 or the concatenation scenes relation DB 217-3. Then, the process is ended and returns.

<<Second Configuration of Typical-Derived Scenes Relation DB>>

FIG. 7A is a diagram showing a second configuration 217-1B of the typical-derived scenes relation DB 217-1 according to the exemplary embodiment.

In the second configuration 217-1B, a derivation verify DB 720 associates a typical scene and derived scenes. In the derivation verify DB 720, a typical scene ID 721 corresponding to the typical scene ID 512 of the typical scene DB 510 and a derived scene ID 723 are associated by frame characteristic amount difference information 722.

(Example of Using Difference Information)

FIG. 7B is a diagram showing an example 700 of using the second configuration 217-1B of the typical-derived scenes relation DB according to the exemplary embodiment.

In FIG. 7B, as a preparation before use, pieces of the frame characteristic amount difference information 722 are sorted in an order of largeness or in an order of smallness in advance. In FIG. 7B, the pieces of the frame characteristic amount difference information 722 are sorted in the order of smallness such as an order of '30', '48', '61', '80' and '91'. Note that, the values are set in order to explain the example of using the difference information. The values are not limited to the above-mentioned value.

In this state, it is assumed that the agreement verification 702 of inputted frame characteristic amounts 701 with the frame characteristic amounts of the typical scene 511 is carried out, and the inputted frame characteristic amounts 701 agree at the difference information '61'. In the coincidence verification 703 following the agreement verification 702, it is possible to realize a high speed process of the coincidence verification by use of the frame characteristic amount difference information 722 as follows.

First, a range of the coincidence verification 703 is restricted to a predetermined range above and below the difference information '61' ('±20' in FIG. 7B). As a result, it is not required to carry out the coincidence verification with all derived scenes. In FIG. 7B, the coincidence verifications with the derived scenes whose difference information is '48', '61', and '80', only, are carried out.

Moreover, the coincidence verifications are carried out in an order of closeness of the difference information to the difference information '61' of the agreement verification. In case that there is a derived scene which is coincident, it is expected that both scenes have near difference information. As a result, if there is the derived scene which is coincident, the coincidence is determined more quickly.

According to the second configuration 217-1B, it is possible to simplify identification of the coincident derived scene shown in Step S625, by calculating difference information between inputted frame characteristic amounts and frame characteristic amounts of the typical scene, and comparing the calculated difference information with the frame characteristic amount difference information registered in the derivation verification DB.

The difference information used here may be one of a vector data like a result of calculating a difference between frame characteristic amounts vectors, a scalar value like a result of calculating a distance between the vectors, or a matrix of results of calculating a distance per a frame.

In case of using a result of calculating a difference between frame characteristic amount vectors between the typical scene and the derived scene as the difference information, it is possible to find out the frame characteristic amounts of the derived scene, on the basis of the frame characteristic amounts of the typical scene and the difference information. Accordingly, association of the typical scene and the derived scene can be realized using less storage capacity. Furthermore, since it is possible to evaluate directly the quantitative relation between the typical scene and each derived scene, it is possible to reduce number of calculations which are necessary, for example, for reconsideration of the typical scene, and to make it possible to process at a high speed.

In case of using a result of calculating a distance between characteristic amount vectors, which include a matrix of a series of video frames of the typical scene and the derived scene, as the difference information, it is possible to make the verification carried out at a high speed by holding the distance value as the difference information and verifying the scene in an order of smallness of the distance value of the derived scene.

(Another Example of Difference Information)

FIG. 7C is a diagram showing another example 750 of the difference information in the second configuration of the typical-derived scenes relation DB according to the exemplary embodiment.

As shown in FIG. 7C, a frame 751 which is included in each inputted scene, and a frame 752 which is included in a typical scene are divided into 16 pieces respectively. Here, while FIG. 7C shows a case equally divided into 4×4 pieces, number, a size and a shape of the divided area have no restriction. An appropriate divided area may be selected on the basis of a tendency in a change of the video or the like. Next, a comparison unit 753 compares corresponding divided areas, and a determining unit 754 determines whether each change is equal to or greater than a threshold value or not. The determination result is expressed by one bit whose value is '1' in case that the change is equal to or greater than the threshold value and '0' in case that the change is smaller than the threshold value.

Since a bit stream 755 corresponding to the result of the process expresses a degree of change by use of 16 bits per one frame in case of 16 division, a degree of change of one scene can be expressed by use of 16 bits×(number of frames of one scene). It is possible to use the value as the difference information in place of or in addition to the difference information of the second configuration 217-1B of the typical-derived scenes relation DB 217-1.

By using the difference information, in case that subtitles are added to the video, a state that changes are added to a band of four areas at a lower part of frame, for example, like a bit stream of a first frame shown in FIG. 7C can be estimated on the basis of the bit stream. Accordingly, it is advantageous for realizing a high speed process also to arrange a specific-derived scenes DB storing a specific scene and its derived scene which are associated each other by such a difference indicated by a bit stream, and to use the specific-derived scenes DB in order to search for the derived scene generated by the change of adding the subtitle or the like.

<<Third Configuration of Typical-Derived Scenes Relation DB>>

FIG. 8 is a diagram showing a third configuration 217-1C of the typical-derived scenes relation DB 217-1 according to the exemplary embodiment.

In the third configuration 217-1C, a typical-derived frames characteristic relation DB 820 associates frame characteristic amounts of a typical scene and frame characteristic amounts of a derived scene. Then, frame characteristic amounts are associated with scene IDs in a scene ID list table 810, respectively. With the third configuration 217-1C, storage capacity of the typical-derived scenes relation DB 217-1 is reduced furthermore.

[Third Exemplary Embodiment]

In the second exemplary embodiment, a scene which appears first is registered as a typical scene, and a scene which appears later and agrees with the typical scene is registered as a derived scene. However, the scene which appears first may not be always the first scene which is an origin of the derivation. Accordingly, in the structured scene group, a scene which should be the derived scene may be arranged as the typical scene, and a scene which should be the origin of the derived scene may be arranged as the derived scene in some times. In this situation, it is caused that, on the basis of the agreement condition to identify the derived scene, a scene which should be the derived scene originally is excluded from the scene group, and a scene which is not the derived scene becomes a member of the scene group. In this exemplary embodiment, periodical restructuring of the frame characteristic amount DB 217 is carried out in such a way that a typical scene or a scene group becomes close to the actual derivation relation. According to the exemplary embodiment, it is possible to realize the structured frame characteristic amount DB 217 which becomes closer to the actual derivation relation.

Note that, since configurations and operations of a video processing system and a video processing apparatus according to the exemplary embodiment are the same as ones according to the second exemplary embodiment, the description of the configurations and the operations are omitted. In the following, restructuring of the frame characteristic amount DB 217, which is added in the exemplary embodiment, will be explained.

<<Concept of Restructuring of Typical-Derived Scenes Relation DB>>

In the exemplary embodiment, a configuration to carry out two types of restructuring selectively will be described. However, neither a method of the restructuring nor a procedure of the restructuring is limited to ones according to the exemplary embodiment. It is possible to apply various processes to make the typical scene close to the origin of the derived scene.

(First Reconfiguration)

FIG. 9A is a diagram showing a concept of a first restructuring 910 of the typical-derived scenes relation DB 217-1. In the following, a case that difference information expressed by a scalar value like a result of calculating a distance between vectors of characteristic amounts, which include a matrix of a series of video frames of a typical scene and a derived scene, is used as difference information is assumed.

On the left side of FIG. 9A, an example of a scene group 911, which is generated in the second exemplary embodiment, is shown. In the scene group 911, a scene which appears first is defined as a typical scene, and scenes whose difference information regarding frame characteristic amount is within a predetermined threshold value from the typical scene are defined as a derived scene. However, around a boundary of the scene group 911 above the typical scene in the figure, many scenes which have almost equal difference information exist collectively. On the other hand, below the typical scene in the figure, only small numbers of derived scenes exist and scenes having the almost equal difference information do not exist collectively around the boundary. In this case, it is very doubtful that the typical scene is the true origin of the derived scenes. Around the boundary of the scene group 911 on an upper side of the figure, the scenes having the almost equal difference information regarding the frame characteristic amount exist separately outside and inside the scene group.

In order to improve this situation, a center position (center of gravity) of the scenes included the scene group is calculated according to the first restructuring 910 as shown on the left side of FIG. 9A. That is, a central scene which makes a summation of pieces of the difference information the smallest is detected. For example, in case that the second derived scene above the typical scene is around the center, the second derived scene is set as a new typical scene. Then scenes whose difference information regarding frame characteristic amounts is within the predetermined threshold from the new typical scene is set as a new derived scene, as shown on the right side of FIG. 9A. In FIG. 9A, two scenes on the upper side are set as a derived scene, and one scene on a lower side is excluded from derived scenes, and the scene group 911 is reorganized as a scene group 912.

(Second Restructuring)

FIG. 9B is a diagram showing a concept of a second restructuring 920 of the typical-derived scenes relation DB 217-1 according to the exemplary embodiment.

On the left side of FIG. 9B, an example of a scene group 921 generated in the second exemplary embodiment is shown. On the vertical axis, a generation time of the scene is set from a bottom (old) to a top (new). The typical scene is the third scene from the oldest out of the scenes having the almost equal difference information regarding frame characteristic amounts. In the figure, three derived scenes newer than the typical scene, and two derived scenes older than the typical scene are included in the scene group 921.

In the second restructuring 920, the oldest scene among the derived scenes is determined as an origin of derived scenes, and is set as a typical scene. As shown on the right side of FIG. 9B, the oldest scene is set as a typical scene, and scenes whose difference information regarding frame characteristic amount is within the threshold from the typical scene is set as a derived scene. As a result, four new scenes are included in a scene group 922 as a derived scene. According to the example of FIG. 2B, the third scene from the oldest is added to the scene group 922 as a derived scene. It is conceivable that the derived scene is far from the typical scene on the left side of the figure, but close to the typical scene on the right side. Two new scenes are excluded from derived scenes.

<<Process of Restructuring Typical-Derived Scenes Relation DB>>

FIG. 10 is a flowchart showing a process of restructuring the typical-derived scenes relation DB 217-1 according to the exemplary embodiment. This flowchart is carried out by CPU 410 using RAM 440.

In Step S1001, the frame characteristic amount storing control unit 216 determines whether a generation date of each scene is recorded. In case that the generation date is recorded, in Step S1003, the frame characteristic amount storing control unit 216 sets the oldest scene in the scene group as a typical scene. On the other hand, in case that the generation date is not recorded, in Step S1005, the frame characteristic amount storing control unit 216 selects, as a center scene of the derivation relations of the scene group, a scene which makes a summation of the difference information regarding the frame characteristic amount the smallest, and sets the center scene as a typical scene.

In Step S1007, the frame characteristic amount storing control unit 216 selects derived scenes on the basis of the newly selected typical scene to restructure a whole of the frame characteristic amount DB 217.

[Fourth Exemplary Embodiment]

In the second and the third exemplary embodiments, a case that one derived scene is included in a plurality of derivation areas (an area in which distance from a typical scene is within a predetermined distance in comparing frame characteristic amounts) is not assumed. However, in case that one derived scene is included in a plurality of derivation areas, it is necessary to consider which scene group of the derivation area the derived scene should be included in or whether the scene group in which the derived scene is currently included is appropriate or not. Moreover, if taking only the derivation area into consideration, a situation that one derived scene is included in a plurality of scene groups also occurs. In this case, a database becomes complicated and the grouping also becomes meaningless. In the exemplary embodiment, one derived scene is controlled to be included in one scene group. Moreover, periodical restructuring of the frame characteristic amount DB 217 is carried out in such a way that a typical scene or a scene group may be close to the actual derivation relation. According to the exemplary embodiment, even if one derived scene is included in a plurality of derivation areas, it is possible to realize the structured frame characteristic amount DB 217 which becomes closer to the actual derivation relation.

<<Incorporation into Scene Group>>

First, an incorporation of a new scene into a scene group in a case that derivation areas overlap each other in the exemplary embodiment will be described.

(Initial State of Scene Group)

Figure 11:
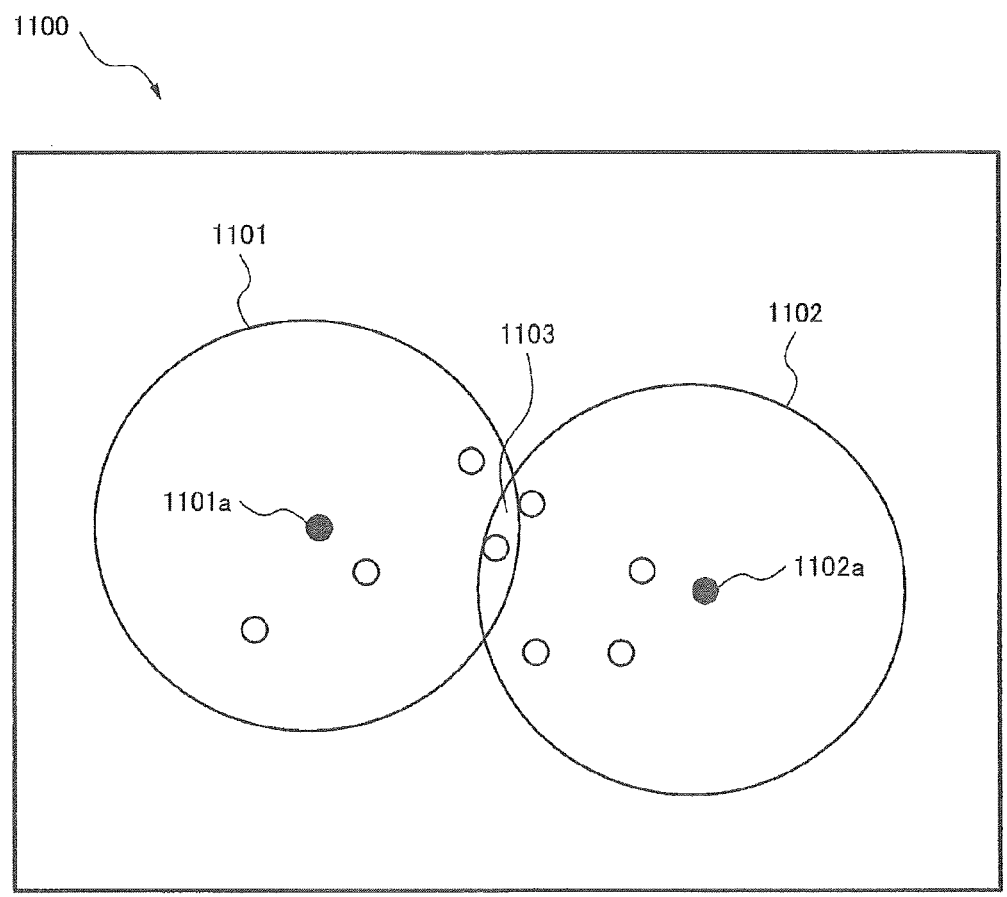
FIG. 11 is a diagram showing an initial state of a typical-derived scenes relation DB according to a fourth exemplary embodiment of the present invention.

FIG. 11 is a diagram showing an initial state 1100 of a typical-derived scenes relation DB according to the exemplary embodiment. Here, a phrase of 'initial state' indicates only a state before the group determination or the restructuring, and does not indicate the first.

In the initial state 1100 of the typical-derived scenes relation DB shown in FIG. 11, there is an overlapping area 1103 where a derivation area 1101 and a derivation area 1102 overlap each other. The derivation areas 1101 and 1102 include typical scenes 1101a and 1102a respectively. Here, the derivation area is expressed by a distance, from the typical scene, corresponding to an agreement determination condition. While the derivation area is actually expressed in a multi-dimensional space, for clear explanation, the deviation area is shown by a circle having a predetermined radius in a two-dimension space in FIG. 11. In case that frame characteristic amounts of a new scene is inputted in this state, which scene group the new scene is incorporated into or how to carry out the restructuring will be described in the exemplary embodiment.

(Configuration of Adjacent Typical Scene DB)

Figure 12:
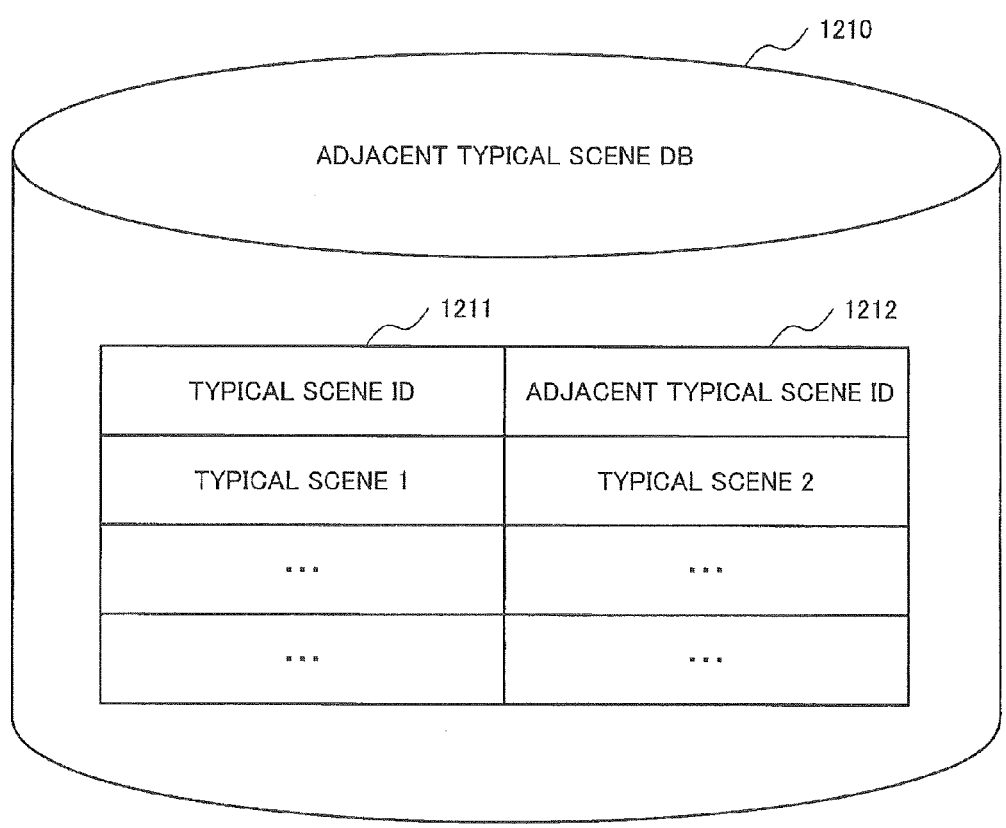
FIG. 12 is a diagram showing a configuration of an adjacent typical scene DB according to the fourth exemplary embodiment of the present invention.

FIG. 12 is a diagram showing a configuration of an adjacent typical scene DB 1210 according to the exemplary embodiment. Note that, the adjacent typical scene DB 1210 may be included in the storage 450 shown in FIG. 4.

The adjacent typical scene DB 1210 stores a typical scene ID 1211 and an adjacent typical scene ID 1212 in association with each other. Here, the adjacent typical scene ID1212 is stored in case that a value of distance between the typical scenes is smaller than a value which is twice the threshold value of the agreement condition. However, it is efficient that the storage of the adjacent typical scene ID 1212 is carried out not by adding new process to decide the distance between the typical scenes but with carrying out the agreement detection of an inputted scene. That is, in case of carrying out the agreement detection for the inputted scene, when typical scenes, between which the distance is smaller than the value which is twice the threshold value, are detected, the typical scene IDs are stored in the adjacent typical scene DB 1210 in association with each other as typical scene IDs of scene groups having a possibility to become the adjacent scenes.

(Process of Detailed Classification)

Figure 13:
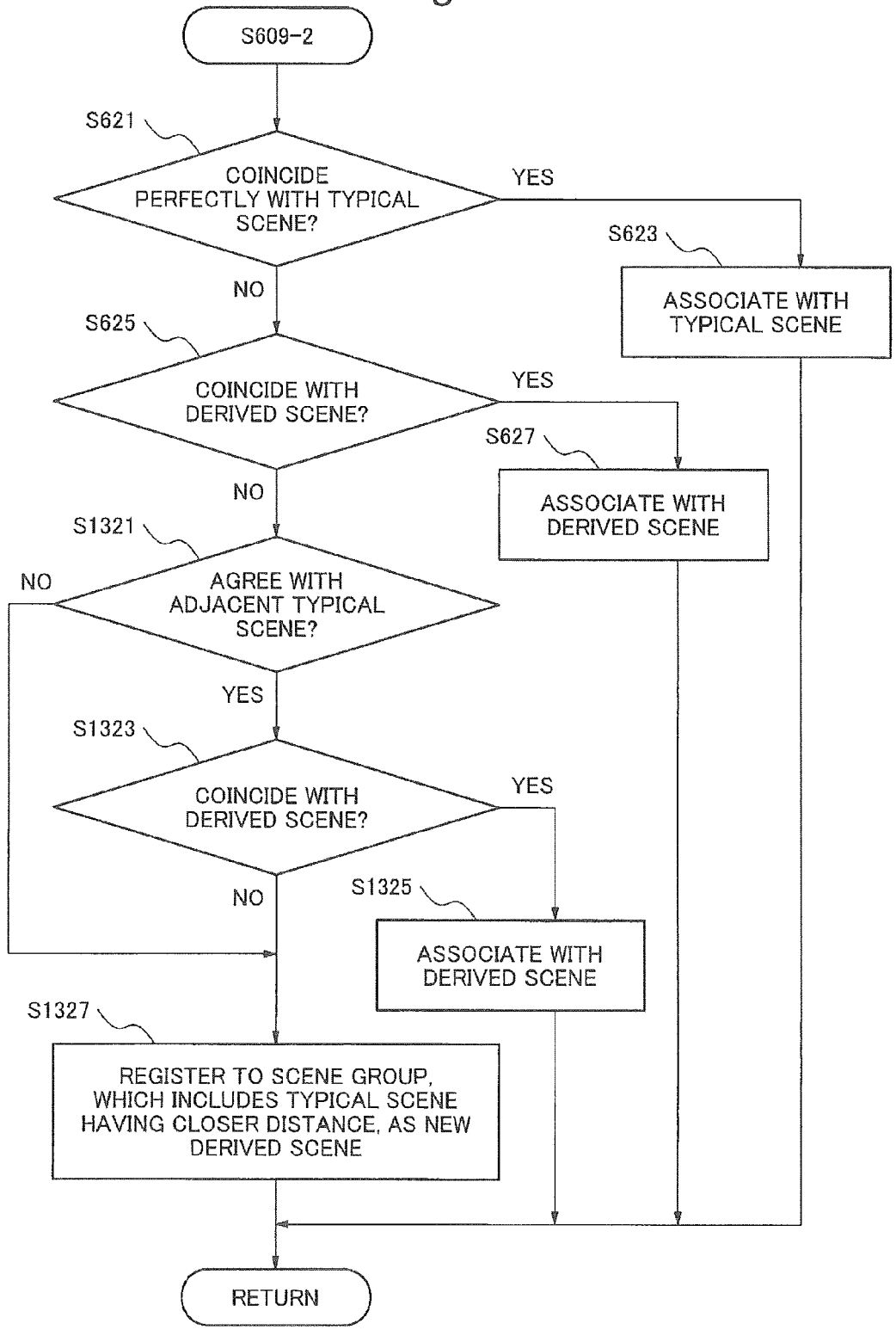
FIG. 13 is a flowchart showing the detailed scene classifying process according to the fourth exemplary embodiment of the present invention.

FIG. 13 is a flowchart showing a process Step 609-2 which is corresponding to the detailed scene classifying process Step S609, according to the exemplary embodiment. A program based on the flowchart is stored in the storage 450 shown in FIG. 4, and is executed by CPU 410 using RAM 440 to realize a function of grouping to a scene group in the exemplary embodiment.

The flowchart replaces the flowchart shown in FIG. 6B corresponding to Step S609 shown in FIG. 6A. Here, since Steps S621 to S627 are similar to Steps S621 to S627 shown in FIG. 6B, description on the steps is omitted. In FIG. 13, in case that the inputted scene is not perfectly coincident with a typical scene (NO in Step S621), and simultaneously is not coincident with a derived scene (NO in Step S625), proceeded to Step S1321.

In Step S1321, when the characteristic amount verifying unit 214 determines that there is an adjacent typical scene with reference to the adjacent typical scene DB 1210, the frame characteristic amount verifying unit 214 verifies whether the inputted scene agrees with an adjacent typical scene. In case that the inputted scene agrees with the adjacent typical scene, in Step S1323, the frame characteristic amount verifying unit 214 verifies whether the inputted scene is coincident with a derived scene included in the scene group including the adjacent typical scene. In case that there is a derived scene which is coincident, in Step S1325, the frame characteristic amount storing control unit 216 associates the inputted scene with the derived scene which is coincident to make the inputted scene incorporated into the scene group including the adjacent typical scene.

On the other hand, in case that the inputted scene does not agree with the adjacent typical scene (NO in Step S1321), or in case that the inputted scene is not coincident with the derived scene (NO of Step S1323), proceeded to Step S1327. In Step S1327, the frame characteristic amount storing control unit 216 registers the inputted scene to the scene group including the typical scene, which has the closer distance to the inputted scene out of two adjacent typical scenes, as a new derived scene.

Note that, while the frame characteristic amount storing control unit 216 selects the scene group which includes the typical scene having closer distance in Step S1327, the frame characteristic amount storing control unit 216 may register the inputted scene as a new derived scene of the typical scene which agrees first, when the inputted scene is not coincident with a derived scene of the adjacent typical scene in case of carrying out the verification with a method which can determine an unique order of verifying with typical scenes. Moreover, while the adjacent typical scene DB 1210 stores typical scenes which are adjacent each other with one to one correspondence, the adjacent typical scene DB 1210 may store all of typical scenes whose value of distance is within twice the value of the agreement condition. By this, it is possible that the same derived scene is not included in a plurality of scene groups, and it is possible to avoid waste of generating a new scene group in which a scene assumed as a derived scene is set as a typical scene.

<<Restructuring of Typical-Derived Scenes Relation DB>>

Next, restructuring of the typical-derived scenes relation DB in case that derivation areas overlap each other according to the exemplary embodiment will be described.

(Concept of Restructuring)

Figure 14:
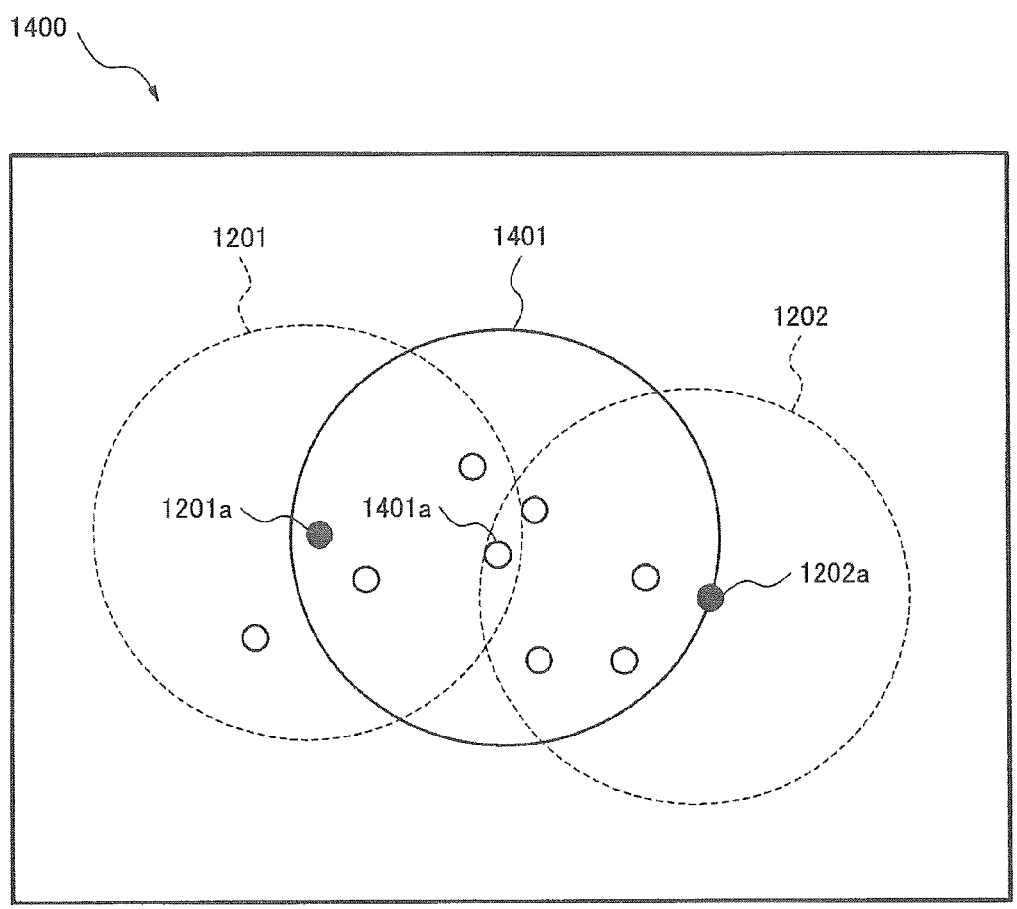
FIG. 14 is a diagram showing a concept of restructuring of the typical-derived scenes relation DB according to the fourth exemplary embodiment of the present invention.

FIG. 14 is a diagram showing a concept of restructuring 1400 of the typical-derived scenes relation DB according to the exemplary embodiment. While the initial state shown in FIG. 12 is exemplified as a premise of the restructuring shown in FIG. 14, the premise is not limited to the initial state.

In FIG. 14, a derivation area 1401 is fixed in such a way as to include the surrounding derived scenes as many as possible. Then, one derived scene, whose total of distances from other derived scenes becomes the shortest, is sets as a new typical scene 1401a. Or, one scene, which can make the surrounding derived scenes incorporated and whose total of distances from other derived scenes is the shortest, is set as a new typical scene 1401a. Then, the derivation area 1401 is determined on the basis of a distance from the new typical scene 1401a, and scene existing in the area is set as a derived scene. Note that, while the derivation area is shown in a two-dimension space for clear description in FIG. 14, the deviation area is actually expressed in a multi-dimension space.

(Process of Restructuring)

FIG. 15 is a flowchart showing a process of restructuring the typical-derived scenes relation DB according to the exemplary embodiment. This flowchart is carried out by CPU 410 using RAM 440.

In Step S1501, the frame characteristic amount storing control unit 216 determines whether the derivation areas of the plural typical scenes, which are targets of the restructuring, overlap each other or not. In case that there is no overlap, proceeded to steps shown in FIG. 10 of the second exemplary embodiment.

In case that the derivation areas overlap each other, in Step S1503, the frame characteristic amount storing control unit 216 sets a derivation area which can include the surrounding derived scenes as many as possible. Then, in Step S1505, the frame characteristic amount storing control unit 216 sets a derived scene, whose total of distances from other derived scenes in the newly set derivation area is the shortest, as a new typical scene.

Note that, the step to select a derived scene, which can make the surrounding derived scenes incorporated as many as possible and whose total of distances from other derived scenes is the shortest, as a typical scene as shown in FIG. 14 is also clear from FIG. 15.

(Process of Derived Scene Excluded from New Scene Group)

When carrying out the above-mentioned restructuring, there is a possibility that a derived scene which is not included in the derivation area of the new typical scene may be caused in any case. In this case, to generate a new scene group, in which the derived scene excluded from the new scene group is set as the typical scene, results in making the typical-derived scenes relation DB subdivided excessively and complicated. Therefore, to generate the new scene group on the basis of the excluded derived scene has an effect reverse to the effect of simplification and high speed processing obtained by using the typical-derived scenes relation DB.

Then, by carrying out the detailed classification process shown in FIG. 13, which is carried out to the inputted scene, to the derived scene which is excluded from the new scene group, it is possible to incorporate the excluded derived scene into any one of the existing scene groups, and consequently it is possible to prevent the typical-derived scenes relation DB from being subdivided excessively and complicated.

[Fifth Exemplary Embodiment]

The above-mentioned second to fourth exemplary embodiments are described focusing on the configuration and the process of making the structured frame characteristic amount DB. According to the exemplary embodiment, an example of using the frame characteristic amount DB will be described. According to the exemplary embodiment, in the video processing system 200 shown in FIG. 2A, when each of the video viewing terminals 260 to 26n sends the frame characteristic amounts of the video content being viewed to the video processing apparatus 210, information on a video content which has a derivation relation with each scene of the video content being viewed, or metadata of a scene which has a derivation relation with each scene are provided to each of the video viewing terminals 260 to 26n. According to the exemplary embodiment, a viewer viewing the video content on the video viewing terminals 260 to 26n can obtain or view information on the derived video content, the derived video content, or information on the metadata added to the derived scene.

Note that, since configurations and operations of a video processing system and a video processing apparatus according to the exemplary embodiment are the same as ones according to the second exemplary embodiment, description on ones according to the exemplary embodiment is omitted, and configuration of a video content-metadata DB 1600 which is added and a procedure of processing the video content-metadata 1600 will be described.

<<Configuration of Content-Metadata DB>>

FIG. 16 is a diagram showing a configuration of a video content-metadata DB 1600 according to the exemplary embodiment. The video content-metadata DB 1600 may be included in the video processing apparatus 210 shown in FIG. 2A or may be included in a server connected via a network.

The video content-metadata DB 1600 stores, in association with each scene ID of a scene ID stream 1610 included in the same scene group, a video content ID of video content including the scene, and a metadata ID of metadata included in the scene. According to FIG. 16, in association with a scene ID 1611, a video content ID 1621 of the video content including the scene, and a metadata ID 1631 of the metadata included in the scene are stored. Moreover, in association with a scene ID 1612, a video content ID 1622 of the video content including the scene, and a metadata ID 1632 of the metadata included in the scene are stored.

<<Procedure of Process for Acquiring a Content or Metadata>>

FIG. 17 is a flowchart showing a process of acquiring the video content or the metadata according to the exemplary embodiment. This flowchart is carried out by CPU 410 using RAM 440.

In Step S1701, the search control unit 218 acquires frame characteristic amounts of a video content being viewed from the video viewing terminals 260 to 26n. In Step S1703, the search control unit 218 acquires a derived scene from the frame characteristic amount DB 217 on the basis of the acquired frame characteristic amounts. In Step S1705, the search control unit 218 acquires a video content ID of a video content including the acquired derived scene. In Step S1707, the search control unit 218 acquires a metadata ID of metadata included in or added to the acquired derived scene. In Step S1709, the search control unit 218 acquires the required video content or required metadata on the basis of the video content ID or the metadata ID. In Step S1711, the search control unit 218 provides the acquired video content or metadata to the sender who has sent the frame characteristic amounts or the video viewing terminals 260 to 26n designated by the sender.

[Another Exemplary Embodiment]

While the exemplary embodiment according to the present invention has been described in detail as mentioned above, also a system or an apparatus, which is realized by any combination of the different features included in the different exemplary embodiments respectively, is included in the scope of the present invention.

Moreover, the present invention may be applied to a system including a plurality of pieces of equipment or may be applied to a stand-alone apparatus. Moreover, the present invention is applicable to a case that a control program, which realizes the functions defined in the exemplary embodiment, is provided directly or remotely to a system or an apparatus. Accordingly, a control program which is installed in a computer to realize the functions of the present invention, a medium which stores the control program or a WWW (World Wide Web) server which makes the control program downloaded is also included in the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2011-131332, filed on Jun. 13, 2011, the disclosure of which is incorporated herein in its entirety by reference.

What is claimed is:

1. A video processing apparatus, comprising:
   a storage unit which stores a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene;
   an input unit which inputs a characteristic amount which is extracted from a new scene; and
   a determining unit which determines whether the new scene represented by the inputted characteristic amount is the derived scene of the scene group or not by verifying the inputted characteristic amount with the characteristic amount of the typical scene of the scene group stored in the storage unit.

2. The video processing apparatus according to claim 1, further comprising a storage control unit which sets the new scene represented by the inputted characteristic amount as the derived scene of the scene group in case the determining unit determines that the inputted characteristic amount agrees with the characteristic amount of the typical scene of the scene group, and sets the new scene represented by the inputted characteristic amount as a new typical scene in case the determining unit determines that the inputted characteristic amount does not agree with the characteristic amount of the typical scene of the scene group.

3. The video processing apparatus according to claim 2, wherein
   in case the determining unit determines that the inputted characteristic amount agrees with the characteristic amount of the typical scene of each of the plurality of the scene groups,
   the storage control unit sets the new scene represented by the inputted characteristic amount as the derived scene of the scene group selected on the basis of a result of verifying with the typical scene of each of the plurality of the scene groups.

4. The video processing apparatus according to claim 1, wherein the storage unit includes:
   a first storage unit which stores the typical scene and the characteristic amount of the typical scene in association with each other;
   a second storage unit which stores the derived scene and the characteristic amount of the derived scene in association with each other; and
   a third storage unit which stores the typical scene and the derived scene in association with each other.

5. The video processing apparatus according to claim 4, wherein the third storage unit further stores a difference between the characteristic amount of the typical scene and the characteristic amount of the derived scene.

6. The video processing apparatus according to claim 5, wherein the difference includes a bit stream indicating a difference of each of divided areas with one bit on the basis of a threshold value, the bit stream being obtained by verifying on each of the divided areas generated by dividing a frame included in a scene.

7. A method for controlling a video processing apparatus comprising:
   storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene;
   inputting a characteristic amount which is extracted from a new scene; and
   determining whether the new scene represented by the inputted characteristic amount is the derived scene of the scene group or not by verifying the inputted characteristic amount with the characteristic amount of the typical scene of the scene group.

8. A non-transitory computer readable storage medium recording thereon a program, causing a computer to perform a method comprising:
   storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene;
   inputting a characteristic amount which is extracted from a new scene; and
   determining whether the new scene represented by the inputted characteristic amount is the derived scene of the scene group or not by verifying the inputted characteristic amount with the characteristic amount of the typical scene of the scene group.

9. A method for generating a database for storing a plurality of scenes included in a scene group and characteristic amounts which are extracted from a series of plural frames included in the respective scenes in the scene group, in association with each other, defining one scene out of the plurality of scenes included in the scene group as a typical scene and the other scenes as a derived scene, the scene group being a group of a plurality of scenes derived from a common scene, comprising:
   extracting a characteristic amount from a new scene;
   verifying the extracted characteristic amount with the characteristic amount of the typical scene of the scene group stored in the database; and
   in case it is determined that the extracted characteristic amount agrees with the characteristic amount of the typical scene of the scene group, setting the new scene represented by the extracted characteristic amount as the derived scene of the scene group, and in case it is determined that the extracted characteristic amount does not agree with the characteristic amount of the typical scene of the scene group, setting the new scene represented by the extracted characteristic amount as a new typical scene.

* * * * *